US009432079B1

(12) United States Patent
Kumar

(10) Patent No.: US 9,432,079 B1
(45) Date of Patent: Aug. 30, 2016

(54) FREQUENCY HOPPED FREQUENCY MODULATION SPREAD SPECTRUM (FHFMSS) MULTIPLE ACCESSING COMMUNICATION SYSTEMS AND METHODS

(71) Applicant: Rajendra Kumar, Cerritos, CA (US)

(72) Inventor: Rajendra Kumar, Cerritos, CA (US)

( * ) Notice: Subject to any disclaimer, the term of this patent is extended or adjusted under 35 U.S.C. 154(b) by 0 days.

(21) Appl. No.: 14/735,532

(22) Filed: Jun. 10, 2015

(51) Int. Cl.
*H04B 1/715* (2011.01)
*H04B 17/345* (2015.01)

(52) U.S. Cl.
CPC ............ *H04B 1/715* (2013.01); *H04B 17/345* (2015.01); *H04B 2001/7152* (2013.01)

(58) Field of Classification Search
CPC ........................... H04B 17/20; H04L 27/0012
USPC ......................................... 375/133, 295, 316
See application file for complete search history.

(56) References Cited

U.S. PATENT DOCUMENTS

| | | | | |
|---|---|---|---|---|
| 4,023,026 | A * | 5/1977 | O'Farrell | G06F 7/584 331/78 |
| 5,090,024 | A | 2/1992 | Vander Mey et al. | |
| 5,881,099 | A * | 3/1999 | Takahashi | H04B 1/707 375/141 |
| 6,240,282 | B1 * | 5/2001 | Kleider | H04B 17/20 375/285 |
| 6,768,442 | B2 * | 7/2004 | Meyers | H03M 1/366 327/65 |
| 6,871,084 | B1 * | 3/2005 | Kingsley | A61B 5/0408 398/183 |
| 8,638,890 | B2 | 1/2014 | Kumar | |
| 8,995,542 | B2 | 3/2015 | Kumar | |
| 2013/0322579 | A1 | 12/2013 | Kumar | |
| 2013/0322580 | A1 | 12/2013 | Kumar | |
| 2013/0322584 | A1 | 12/2013 | Kumar | |

OTHER PUBLICATIONS

U.S. Appl. No. 14/244,774, filed Apr. 13, 2014; R. Kumar, "Orthogonal Frequency Chirp Multiple Accessing Systems and Methods," US Patent application.
Ashrafi and R. Adhami, "A Direct Digital Frequency Synthesizer Utilizing Quasi-Linear Interpolation Method," IEEE International Symposium on Circuits and Systems, 2007.
S. Glisic, Z. Nikolic, N. Milosevic, and A. Pouttu, "Advanced Frequency Hopping Modulation for Spread Spectrum WLAN," IEEE Journal on Selected Areas in Communication, vol. 18, No. 1, Jan. 2000.
R. Kumar, "Performance of an Incoherent Receiver for the Command Destruct Signals of the Space Lift Range System," Proceedings of the 2004 AIAA International Communication Satellite Systems Conference, Monterey, California, May 9-12, 2004.

(Continued)

*Primary Examiner* — Freshteh N Aghdam
(74) *Attorney, Agent, or Firm* — Fulwider Patton LLP

(57) ABSTRACT

Various embodiments of the invention are directed to frequency hopped frequency modulation spread spectrum (FHFMSS) multiple accessing systems and methods. For example, various embodiments of the FHFMSS transmitter may utilize an architecture comprised of a baseband modulation subsystem, a code generation subsystem for generating a multiplicity M code vector sequences, a frequency synthesizer for generating a multiplicity M periodic waveforms, a frequency modulator for generation of a frequency hopped frequency modulation (FHFM) waveform, and a spread spectrum modulator. Various embodiments of the FHFMSS receiver may comprise of a subsystem for generation of the FHFM waveform, a spread spectrum demodulator, a symbol detector, and a baseband demodulation subsystem.

20 Claims, 20 Drawing Sheets

(56) References Cited

OTHER PUBLICATIONS

R. Kumar, "Analysis of FM Demodulator Output Noise with Applications to the Space Lift Range System," 2006 IEEE Aerospace Conference, 0-7803-9546-08/06, 2006.

R. Kumar, "Analysis of FM Demodulator Output Noise with Applications to FM Telemetry," Journal of Applied Mathematics and Decision Sciences, vol. 2006, Article ID 53649, pp. 1-13, Hindawi Publishing Corporation, 2006.

R. Kumar and W. J. Hurd, "A Class of Optimum Digital Phase Locked Loops for the DSN Advanced Receiver," TDA Progress Report 42-83, Jul.-Sep. 1985, pp. 63-80, Jet Propulsion Laboratory, California Institute of Technology.

R. Kumar and M. Khan, "Mitigation of Multipath Effects in Broadband Wireless Systems using Quantized State Adaptive Equalization method," Proceedings of the IEEE Aerospace Engineering Conference, Mar. 2006, Big Sky, Montana, pp. 1-9. (7).

R. Kumar and K. Khor, "Adaptive Decision-Directed Quantized State Algorithms for Multi-User Detection of CDMA Signals," Proceedings of the 2007 IEEE Aero (Aerospace and Electronic Systems) Conference, Big Sky, Montana, Mar. 2007.

F. J. MacWilliams and J. A. Sloane, "Pseudo-random Sequences and Arrays," Proc. IEEE, vol. 64, pp. 1715-1729, Dec. 1976.

H. Minn, V.K. Bhargava,and K.B. Lataief, "A Robust Timing and Synchronization for OFDM System," IEEE Transactions on Wireless Communications, vol. 2, No. 4, pp. 822-839, Jul. 2003.

H. Ochiai and H. Imai, "MDPSK-OFDM with Highly Power Efficient Block Codes for Frequency-Selective Fading Channels," IEEE Transactions on Vehicular Technology, vol. 49, No. 1, Jan. 2000, pp. 74-82.

S. Ohno, E. Manasseh, and M. Nakamoto, "Preamble and Pilot Symbol Design for Channel Estimation in OFDM Systems with Null Subcarriers," EURASP Journal on Wireless Communication and Networking, Feb. 2011, pp. 1-17.

T.M. Schmidl and D.C. Cox, "Robust Frequency and Timing Synchronization for OFDM," IEEE Transactions on Communications, vol. 45, No. 12, pp. 1613-1621, Dec. 1997.

R.van Nee and A. de Wild, "Reducing the Peak-to-Average Power Ratio of OFDM", Vehicular Technology Conference, 1998. VTC98. 48th IEEE, vol. 3, pp. 2072-2076, May 1998.

J. van de Beek, M. sandell, and P.O. Borjesson "ML Estimation of Time and Frequency Offset in OFDM Systems," IEEE Transactions on Signal Processing, vol. 45, No. 7, pp. 1800-1805, Jul. 1997.

\* cited by examiner

FREQUENCY HOPPED FREQUENCY MODULATION SPREAD SPECTRUM (FHFMSS) MULTIPLE ACCESSING COMMUNICATION SYSTEMS AND METHODS

BACKGROUND

Broadband wireless systems are in a rapidly evolutionary phase in terms of the development of various technologies, development of various applications, deployment of various services and generation of many important standards in the field. Although there are many factors to be considered in the design of these systems, the key factors have been the bandwidth utilization efficiency due to the limited bandwidth allocation, flexibility in operation and robustness of the communication link in the presence of various disturbances while achieving the specified performance. At present, the OFDM and spread spectrum techniques have been adapted in many wireless communication standards, such as the World-wide Interoperability for Microwave ACCESS (Wimax), digital audio broadcasting (DAB), digital video broadcasting-terrestrial (DVB-T), Long Term Evolution (LTE), Universal Mobile Telecommunications Service (UMTS) or Code Division Multiple Accessing (CDMA) 2000, Wideband CDMA (W-CDMA), CDMA standard IS95, IEEE 802.11 Wireless Local Area Network (WLAN), IEEE 802.15 Wireless Private Area Network (WPAN), etc.

One of the advantages of the OFDM system is the mitigation of a major source of distortion present in high data rate wireless communication links, namely the inter symbol interference (ISI) achieved by increasing the symbol period by the use of multiple carrier transmission. However, the use of a large number of carriers based on the orthogonality property in the OFDM system makes the performance of the system very sensitive to any carrier frequency offsets introduced, for example, by the Doppler shifts encountered in the wireless channels. The proper operation of the OFDM system requires means for precise estimate of the Doppler that may be different for different carriers in the frequency selective fading channel, and means to mitigate such a Doppler effect from the received OFDM signal. Another important problem arising with the use of a relatively large number N of carriers used in the OFDM signal is a relatively high peak to average power ratio resulting in a much reduced radio frequency (RF) power amplifier efficiency. Various methods exist in the prior art to solve these problem.

In multiple accessing mode of the OFDM system wherein relatively narrow band OFDM channels are assigned to various users in a mobile communication network, the frequency selective fading of the communication channel may cause severe fading of some of the user signals resulting in frequent hand offs or call drop for such users in a mobile communication network. The solution to such a problem may be the transmission of the user signal over multiple OFDM channels for providing a diversity gain and/or transmission at a much reduced data rate. However, such a solution results in a reduced capacity of the OFDM system. Another problem with the OFDM system is that the narrow band signals of various users have no protection against any intended or unintended interference. Any significant narrowband interference in any of the OFDM channels may disrupt communication to users assigned such channels.

Spread spectrum systems provide protection against narrow band interference and possess various other desirable properties such as graceful degradation with increased number of active multiple access users, etc. There are mainly two types of spread spectrum systems in use in the mobile communication networks, viz., the direct sequence spread spectrum (DSSS) system and the frequency hopped spread spectrum (FHSS) system. In the DSSS system, the baseband modulated signal is modulated in a second stage by a pseudo random binary sequence resulting in a spreading of the signal bandwidth that results in the protection against narrow band interference. However, in the wireless networks, due to the increased self noise in the system resulting from multipath propagation, the DSSS system may be more suited for a relatively short range multiple accessing application or long range point to point communication by using separation of the multipath components using, or example, a rake receiver. In the FHSS system, the carrier frequency of the baseband modulated signal is varied according to some pseudo random (PN) pattern or sequence that varies at the information symbol rate or a integer multiple thereof in the fast FHSS system, and results in the spreading of the signal bandwidth that depends upon the number of frequencies in the pseudo random pattern. The FHSS system may offer more protection against multipath over relatively longer distances compared to the DSSS system.

In the FHSS system, different users are assigned different pseudo random frequency sequences. A disadvantage of the FHSS system may be that whenever, the frequencies of more than one PN sequence coincide, that results in a collision whereby the symbols during such a collision period are erased placing a floor on the probability of symbol error irrespective of the signal to noise ratio or other parameters. Similarly the presence of narrow band interference around any one of the hop frequencies may result in the erasure of the symbol being transmitted during that hop. For example, if 2 out of 100 hop frequencies are interfered with, the probability of symbol error will be lower bonded by 0.02. This is different compared to the DSSS system wherein the narrow band interference is spread out in a wide band in the despreader at the receiver causing a relatively small degradation in the probability of symbol error. Moreover, the FHSS system requires a frequency synthesizer for the generation of pseudo random frequency sequence capable of generating a relatively large number of frequencies with relatively high switching speeds equal to the information symbol rate, or a integer multiple thereof with relatively low noise and a relatively high precision frequencies present in the pseudo random frequency sequence.

Kumar teaches an orthogonal frequency chirp multiple accessing (OFCM) spread spectrum system in Orthogonal Frequency Chirp Multiple Accessing Systems and Methods, U.S. patent application Ser. No., 14/244,774, 2014, wherein the baseband modulated signals are modulated by a time varying frequency waveforms such that an orthogonality is maintained among the various multiple accessing signals. The OFCM system taught by Kumar is a spectrally efficient and provides protection against both the interference and frequency selective fading due to multipath propagation. The OFCM system, however, may not provide any privacy protection to the multiple accessing users. As the time varying frequency waveforms are delayed versions of a common waveform whose frequency varies linearly with time, an unauthorized user can easily receive the baseband information symbols intended for the other multiple accessing users.

There is a strong motivation to come up with systems and methods that achieve the various advantages of the prior art spread spectrum systems while overcoming various possible weaknesses therein. The frequency hopped frequency modulation spread spectrum (FHFMSS) system of the invention provides protection against deep fades in some segments of the spectrum and against narrowband interference similar to that of the DSSS system in that the impact of any narrow band interference is distributed throughout the spread bandwidth after the despreading at the receiver rather than being concentrated in a few symbols as in the FHSS system of prior art placing a floor on the probability of symbol error. In the FHFMSS system, the wideband Frequency Hopped Frequency Modulation (FHFM) spreading waveform is generated by Frequency Modulation (FM) modulation of a multiplicity of the periodic waveforms with time varying frequencies determined by pseudo random sequences. The FHFM waveform in turn modulates the baseband modulated signal. A deterministic short sequence of frequency pairs has been previously used in the construction of a command destruct code in the space lift range system.

Unlike the FHSS system of the prior art, the spectrum of the FHFMSS signal occupies a wide bandwidth during any symbol period. Deep fading in a few segments of the wide band spectrum may not result in any significant performance degradation to any of the users. In the prior art FHSS system, the number of hop frequencies and the period of the pseudo random (PN) sequences may be both equal to the bandwidth spreading factor that is the ratio of the FHSS signal bandwidth and the baseband modulated signal bandwidth with the switching speed of the frequency synthesizer equal to or an integer multiple of the baseband information symbol rate. In the FHFMSS system of the invention, the various parameters such as the number of hop frequencies, the period of the PN code, the bandwidth spreading factor , and the switching speed of the frequency synthesizer may be selected independently so as to minimize the transmitter complexity while achieving the desired spread spectrum signal bandwidth. The FHFMSS has the advantage of not requiring a relatively very large number of hop frequencies and high switching speeds of the frequency synthesizer in the FHSS system of the prior art.

The FHFMSS system of the invention also inherits various advantages of the prior FHSS system in that it provides robustness against multipath propagation interference and even a better privacy protection compared to both the DSSS and FHSS system. In the FHFMSS system of the invention, individual user signals with modulations such as MPSK (Multi Frequency Shift Keying), are constant envelope signals inheriting the property from the frequency modulated (FM) signals with an advantage in terms of requiring relatively low amplifier back off in the user to base station transmission in a mobile communication network. Unlike the prior art DS spread spectrum systems, the power spectral density of the FHFMSS system of the invention does not have any spectral side lobes. These and other advantages of the FHFMSS system will be evident from the following specifications.

SUMMARY OF THE INVENTION

Various embodiments of the invention are directed to methods and systems for frequency hopped frequency modulation spread spectrum (FHFMSS) transmitters and receivers for multiple accessing communication over wireless fading channels. For example, various embodiments of the transmitter may utilize an architecture comprised of a baseband modulation subsystem for receiving and modulating the input data providing the, in general complex valued, information baseband symbols, a code generation subsystem for generating a multiplicity M code vector sequences, a multi frequency synthesizer for the generation of the multiplicity M sequences of periodic $\psi$-waveforms, a complex baseband frequency modulator (FM) for providing a frequency hopped frequency modulation (FHFM) waveform, a spread spectrum modulator for modulating the information baseband symbols sequence by the FHFM waveform providing the baseband FHFMSS (frequency hopped frequency modulation spread spectrum) signal.

Various embodiments of the FHFMSS transmitter of the invention may be further comprised of a baseband to IF converter modulating the baseband FHFMSS signal by the IF local oscillator in phase and quadrature signals for providing the IF band pass FHFMSS signal, and an RF stages unit comprised of an up converter, an RF band pass filter and power amplifier for providing the RF band pass FHFMSS signal.

In various embodiments of the invention, the code generation subsystem for generating a multiplicity M code vector sequences may be comprised of a multiplicity M feedback shift registers of length $N_B$ with $K_B$ of the $N_B$ stages' outputs of the feedback shift registers comprising the elements of the multiplicity M code vectors. In various embodiments of the invention, different feedback connections in the feedback registers may correspond to distinct minimal polynomials of degree $N_B$ resulting in a period of the code vector sequences equal to $2^{N_B}-1$.

In various embodiments of the invention, a multi frequency synthesizer for the generation of the multiplicity M sequences of periodic $\psi$-waveforms may comprise of a multiplexer for time multiplexing the multiplicity M code vector sequences, a code conversion unit for generating a sequence of periodic $\psi$-waveforms indices, and a time multiplexed direct digital frequency synthesizer (TMDDFS) for generation of the periodic $\psi$-waveforms corresponding to the indices provided by the code conversion unit. In various alternative embodiments of the invention, the multi frequency synthesizer unit may generate an integral version $\psi^I(t)$ of the $\psi(t)$ waveforms. In various embodiments of the invention, the $\psi(t)$ waveforms may be sinusoidal waveforms of some specified frequencies that may be integer multiples of a fundamental frequency $f_0$. In various alternative embodiments of the invention, the frequency synthesizer may be an indirect frequency synthesizer based on phase lock loops, a direct analog frequency synthesizers, and the like.

In various digital embodiments of the invention, the complex baseband frequency modulator unit may be comprised of a multiplicity M scalar multipliers for scaling the discrete time waveforms $\psi^I(n)$, n denotes time index, generated by the frequency synthesizer unit by a set of modulation indices, an adder for adding the scaled waveforms, a rate converter for an up conversion of the sampling rate of the resulting sum, and an exponentiation unit for providing a frequency hopped frequency modulation (FHFM) waveform to the spread spectrum modulator.

In various embodiments of the invention, the time multiplexed direct digital frequency synthesizer (TMDDFS) may be comprised of a multiplicity M frequency registers for storing the $\psi^I$-waveform indices that may be equal to the normalized frequencies of the of the sinusoidal $\psi^I$-waveforms, a multiplicity M phase accumulators for modulo integer $N_s$ accumulating the corresponding normalized frequencies, and a ROM memory wherein the sampled $\psi^I$-waveforms are stored. In various embodiments of the invention wherein the $\psi^I$-waveforms are sinusoidal waveforms with frequencies that are multiples of a fundamental frequency $f_0$, the ROM may store the sampled version of only the sinusoidal waveform of frequency $f_0$ sampled at an appropriate sampling rate. The integer $N_s$ may be equal to the number of samples in the ROM.

In various alternative embodiments of the invention, the code generation subsystem may be comprised of a feedback shift registers of length $N_B$ with $K_B$ of the $N_B$ stages' outputs of the feedback shift registers comprising the elements of the first of the multiplicity M code vectors with the other (M−1) code vectors obtained by feed forward circuits operating on the $N_B$ stages' outputs of the feedback shift register.

In various embodiments the baseband modulator may be one out of the group comprised of the Multiple Quadrature Amplitude Modulation (MQAM) modulator, the Multiple Phase Shift Keying (MPSK) modulator, the Multiple Amplitude Shift Keying (MASK) modulator, or any more general modulator architecture. The baseband modulator may also be comprised of error correction encoders and interleavers.

Various embodiments of the FHFMSS receiver of the invention may utilize an architecture comprised of a receive antenna for receiving the radio Frequency (RF) band pass FHFMSS signal, an RF front stage unit comprised of an RF filter, amplifier and down converter for providing the Intermediate Frequency (IF) band pass FHFMSS signal, an IF to complex baseband converter providing the baseband FHFMSS signal, a code generation subsystem for generation of a multiplicity M code vectors, a multi frequency synthesizer for the generation of the multiplicity M sequences of periodic ψ-waveforms, a complex baseband frequency modulator (FM) for providing a frequency hopped frequency modulation (FHFM) waveform, a spread spectrum demodulator for despreading the baseband FHFMSS signal by the FHFM waveform providing the despread signal, a symbol detector and a baseband demodulator. The symbol detector may be comprised of an integrator and a decision device wherein the integrator may average out an integer $N_m$ samples of the despread signal inputting the result to the decision device.

The decision device in the symbol detector detects the information baseband symbols on the basis of the signal constellation diagram of the baseband modulator at the FHFMSS transmitter providing the detected symbol to the baseband demodulator unit.

The baseband demodulator may map the detected baseband symbols into groups of m digits, wherein m=$\log_2$ (M) assumed to be an integer, using the inverse of the map from group of m binary digits into 1 out of M possible information baseband symbols used in the baseband modulator at the FHFMSS transmitter. In various embodiments of the invention, the baseband demodulator may also be comprised of an error correction decoder and a deinterleaver.

BRIEF DESCRIPTIONS OF THE DRAWINGS

Various embodiments of the present invention are described here by way of examples in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide systems and methods for frequency hopped frequency modulation spread spectrum (FHFMSS) multiple accessing communication systems.

Figure 1:
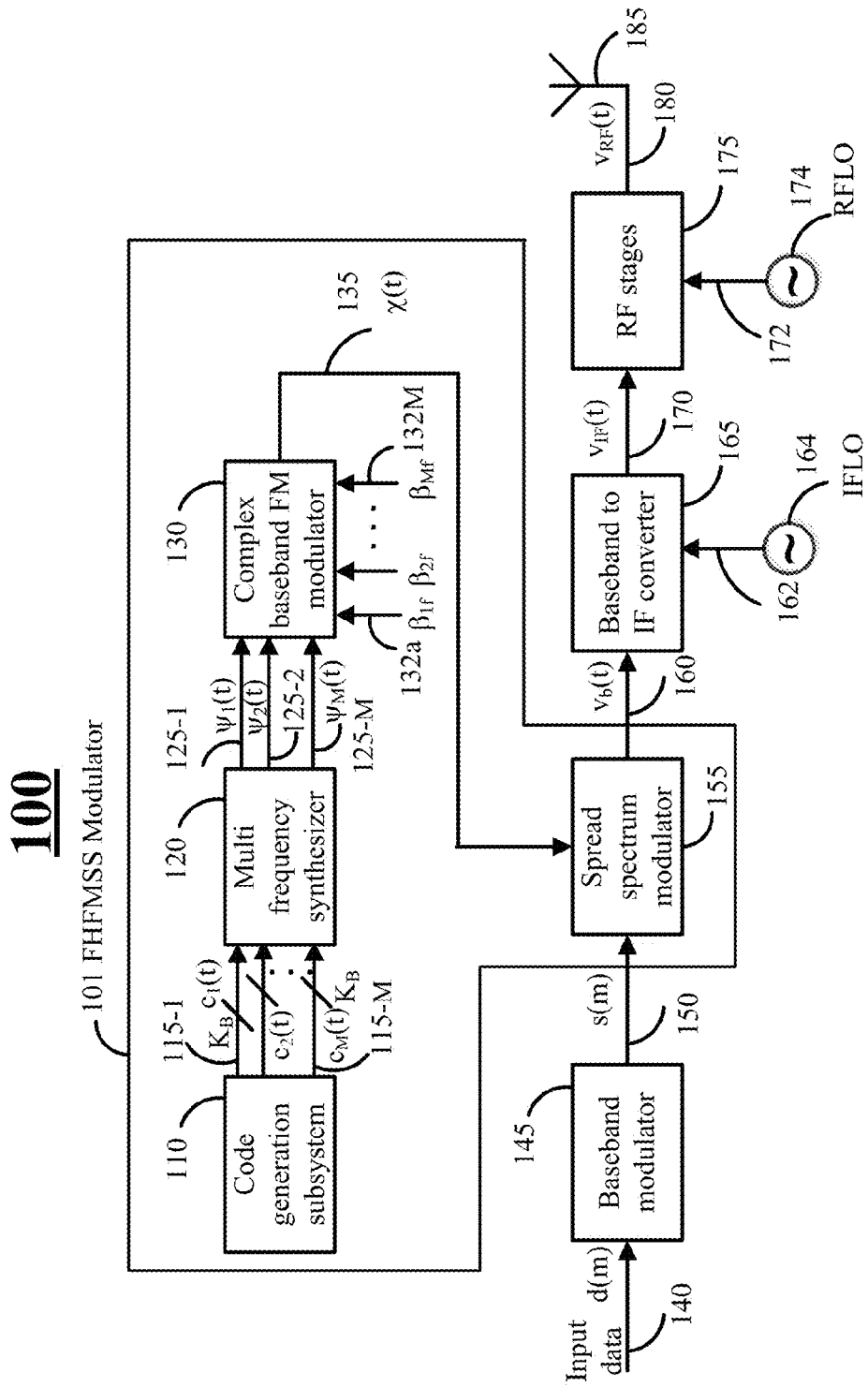
FIG. 1 shows a block diagram of one embodiment of FHFMSS (Frequency Hopped Frequency Modulation Spread Spectrum) transmitter.

FIG. 1 shows the block diagram of one of the various embodiments of the invention. Referring to the FHFMSS (Frequency Hop Frequency Modulation Spread Spectrum) system transmitter 100 block diagram in FIG. 1, the input data 140 d(m) is inputted to the baseband modulator 145. The data 140 d(m) may be binary valued taking values 0 and 1, wherein m denotes the discrete time. In various embodiments of the invention, the transmitter may be located at the base station of a mobile network and the data d(m) may be destined for a mobile user in the cell served by the base station. In various other embodiments of the invention, the transmitter may be part of the mobile user equipment with a plurality of data streams destined to the same base station, wherein the plurality of the data streams may be combined in to a single data stream d(m) by a parallel to serial converter, not shown in FIG. 1.

Referring to FIG. 1, the baseband modulator 145 segments the user input data 140 d(m) into groups of m binary valued data bits and maps each of the groups of the m binary data bits into one of the M=$2^m$, in general complex valued, information baseband symbols 150 s(m) with m selected equal to an integer greater than or equal to 1. The one to one mapping of the groups of m binary valued data bits into the corresponding baseband symbol may be based on any of the baseband modulation techniques, selected, for example, from the set of the MQAM (Multiple Quadrature Amplitude Modulation), the MPSK (Multiple Phase Shift Keying), and the MASK (Multiple Amplitude Shift Keying) modulation techniques. In various embodiments of the invention, the baseband modulator may also be comprised of an error correction code encoder and an interleaver.

Referring to FIG. 1, the information baseband symbol 150 s(m) is inputted to the FHFMSS modulator 101. Referring to FIG. 1, the code generation subsystem 110 generates a multiplicity M code vector waveforms 115 $c_1(t), c_2(t), \ldots, c_M(t)$ wherein each of the code vector waveforms $c_n(t)$ is a vector valued function of time t possibly taking values 0 and 1 with $K_B$ denoting the dimension of the vector $c_n(t)$. In various embodiments of the invention, the various code vector waveforms may be generated by feedback shift registers of length $N_B$ with $K_B$ of the $N_B$ stages' outputs of the feedback shift register comprising the $K_B$ elements of the vector waveforms $c_n(t)$, $1 \leq n \leq M$. In various alternative embodiments of the invention, the elements of the vector waveforms $c_n(t)$ may be periodic functions of time.

Referring to FIG. 1, the multiplicity M code vector waveforms 115 $c_1(t), c_2(t), \ldots, c_M(t)$ are inputted to the multi frequency synthesizer 120. The multi frequency synthesizer 120 generates a multiplicity M periodic waveforms $\psi_1(t), \psi_2(t), \ldots, \psi_M(t)$ on the basis of the respective one of the code vector waveforms 115 $c_1(t), c_2(t), \ldots, c_M(t)$. In various embodiments of the invention the waveform $\psi_n(t)$ may be a sinusoidal waveform with its possibly time varying frequency selected form 1 out of $2^{K_B}$ possible values based on the $2^{K_B}$ possible values taken by the corresponding code waveform $c_n(t)$ for n equal to 1 through M. For example with $K_B=8$, the number of distinct frequencies of the waveforms $\psi_n(t)$ may be equal to 64. In various other embodiments of the invention the waveforms $\psi_n(t)$ may be different from the sinusoidal waveforms.

Referring to FIG. 1, the multiplicity M waveforms 125 $\psi_1(t), \psi_2(t), \ldots, \psi_M(t)$ are inputted to the complex baseband FM (Frequency Modulation) modulator 130. Referring to FIG. 1, the complex baseband FM modulator 130 is provided with the modulation coefficients 132 $\beta_{1f}, \beta_{2f}, \ldots, \beta_{Mf}$. The product of the modulation coefficient $\beta_{nf}$ and the peak amplitude of the waveform $\psi_n(t)$ is equal to the peak frequency deviation in radians/sec due to the waveform $\psi_n(t)$ for n in the range of 1 through M. In various alternative embodiments of the invention, the FM modulator may be an IF (Intermediate Frequency) FM Modulator modulating an IF local oscillator signal 162 $\cos(2\pi f_{IF}t)$ provided by the IF local oscillator 164.

The complex baseband FM modulator 130 frequency modules the multiplicity M waveforms 125 $\psi_1(t), \psi_2(t), \ldots, \psi_M(t)$ providing the complex valued FHFM (Frequency Hop Frequency Modulation) waveform 135 $\chi(t)$ given by (1).

$$\chi(t) = \exp\left[j \int_{-\infty}^{t} \{\beta_{1f}\psi_1(\tau) + \ldots + \beta_{Mf}\psi_M(\tau)\} d\tau\right]; j = \sqrt{-1} \quad (1)$$

Referring to FIG. 1, the information baseband symbols 150 s(m) with a symbol rate of $R_s=1/T_s$ sps (symbols per second) are inputted to the spread spectrum modulator 155 wherein $T_s$ is the symbol period. The spread spectrum modulator 155 is provided with the complex valued FHFM waveform 135 $\chi(t)$ that modulates the information baseband symbol sequence 150 s(m) providing the baseband FHFMSS (Frequency Hop Frequency Modulation Spread Spectrum) signal 160 $v_b(t)$ at the output given by $$v_b(t)=s(m)\chi(t); (m-1)T_s \leq t<mT_s; n=0, 1, \ldots, N-1 \quad (2)$$

In various embodiments of the invention the waveforms $\psi_n(t)$, n=1, 2, . . . , M may be sinusoidal waveforms with their respective frequencies $\omega_1, \omega_2, \ldots, \omega_M$ rad/sec and given by $$\psi_n(t)=\cos(2\pi f_n t); f_n=(\omega_n/2\pi); n=1, 2, \ldots, M \quad (3)$$

With the waveforms $\psi_n(t)$, n=1,2, . . . , M selected as the sinusoidal waveforms, the baseband FHFM waveform 135 $\chi(t)$ may be written as $$\chi(t) = \exp\left[j\sum_{n=1}^{M} \beta_n \sin(2\pi f_n t)\right]; \beta_n = \beta_{nf}/(2\pi f_n), n=1, 2, \ldots, M \quad (4)$$

In various embodiment of the invention, the frequencies $f_n$ may all be selected equal to some integer multiples of the frequency $f_0=1/T_0$ wherein $T_0$ is equal to the symbol period $T_s$. In various alternative embodiments of the invention, the period $T_0$ may be equal to $T_s/N_m$ for some integer $N_m>1$. The modulation coefficients $\beta_{nf}$ may be selected such that the equivalent phase modulation index $\beta_n$ termed mod index for the $n^{th}$ sinusoidal signal is equal to a constant $\beta$ for all indices n between 1 through M. In the various embodiments of the invention the selection of the frequencies $f_n$ and the frequency modulation coefficients $\beta_{nf}$ in the aforesaid manner results in the FHFM waveform 135 $\chi(t)$ given by $$\chi(t) = \exp\left[j\beta \sum_{n=1}^{M} \sin(2\pi \kappa_n f_0 t)\right]; f_n = \kappa_n f_0, n=1, 2, \ldots, M \quad (5)$$

In (5) the $\kappa$ coefficients $\kappa_n$ are some integers which may be all distinct and are equal to the normalized frequencies $(f_n/f_0)$.

Referring to FIG. 1, the baseband FHFMSS signal 160 $v_b(t)$ is inputted to the baseband to IF converter 165 that modulates the signal 160 $v_b(t)$ by the IF (Intermediate Frequency) local oscillator in phase and quadrature signals 162 $\cos(2\pi f_{IF}t)$ and $\sin(2\pi f_{IF}t)$ provided by the IF local oscillator (IFLO) 164 generating the IF FHFMSS band pass signal 170 $v_{IF}(t)$ given by $$v_{IF}(t)=Re\{v_b(t)\exp[j2\pi f_{IF}t]\}=Re(v_b(t))\cos(2\pi f_{IF}t)-Im(v_b(t))\sin(2\pi f_{IF}t) \quad (6)$$

In (6) $f_{IF}$ denotes the IF frequency and Re( ) and Im( ) denote the real part and imaginary part operators respectively.

Referring to FIG. 1, the IF FHFMSS band pass signal 170 $v_{IF}(t)$ is inputted to the RF stages block 175. The RF stages block is inputted by the RF local oscillator signal 172 provided by the RF local oscillator (RFLO) 174 and may be comprised of an up converter, an RF band pass filter and power amplifier providing the RF FHFMSS signal 180 $v_{RF}(t)$ to the antenna 185. The RF signal 180 is given by $$v_{RF}(t)=\sqrt{P_G}Re\{v_b(t)\exp[j2\pi f_c t]\} \quad (7)$$

In (7) $f_c$ denotes the carrier frequency of the RF signal, and $P_G$ is the power gain of the RF stages unit 175.

Figure 1A:
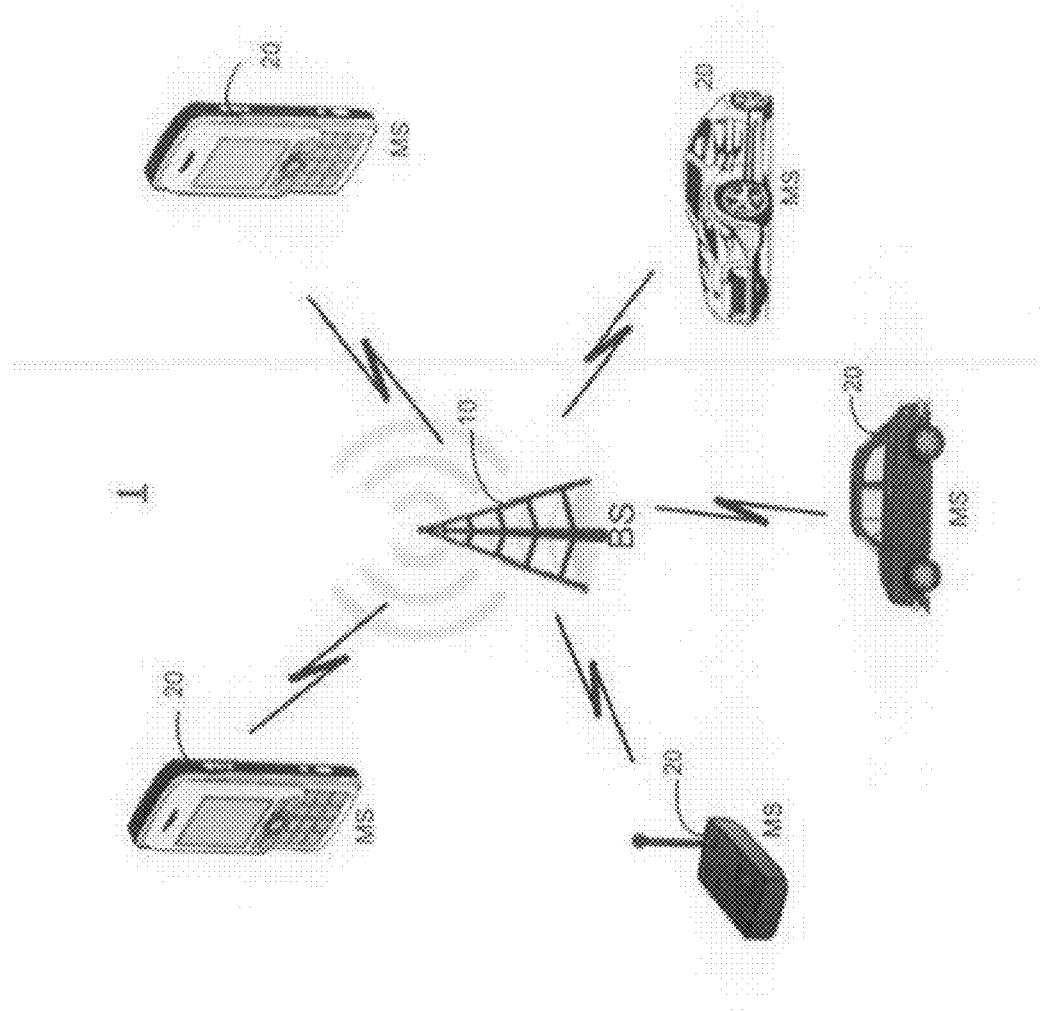
FIG. 1A shows a diagram of a cellular communication system.

FIG. 1A shows a simplified diagram of a mobile communication network 1. Referring to FIG. 1A, the mobile communication network is comprised of a BS (base station) 10 and a number $N_u$ of mobile subscriber units (MS) 20. The mobile communication network of Figure 1A may operate in a FHFMSS multiple access mode wherein each of the MSs 20 may be equipped with a FHFMSS transmitter 100 and a FHFMSS receiver 700 shown in FIG. 7. The base station may be comprised of a multiplicity $N_u$ of the FHFMSS transmitters and receivers that may share a common RF stage and a transmit and receive antenna and possibly a common baseband to IF converter unit wherein a multiplicity $N_u$ of the baseband FHFMSS signals are added for providing a composite baseband FHFMSS signal that is inputted to the baseband to IF converter unit.

In the multiple access embodiments of the invention, a multiplicity $N_u$ of FHFMSS transmitters located at the MS units 20a through $20N_u$ may generate $N_u$ distinct FHFM waveforms by selection of $N_u$ different sets of κ coefficients $κ_{un}$ with the FHFM (Frequency Hop Frequency Modulation) waveform generated by the $u^{th}$ FHFMSS transmitter given by $$\chi_u(t) = \exp\left[j\beta \sum_{n=1}^{M} \sin(2\pi \kappa_{un} f_0 t)\right]; u = 1, 2, \ldots, N_u \quad (8)$$

In various embodiments of the invention the number of waveforms M and the modulation coefficient β may be different for different FHFMSS transmitters. The correlation coefficient $\rho_{u_1 u_2}$ between a pair of waveforms $\chi_{u_1}(t)$ and $\chi_{u_2}(t)$ may be evaluated as $$\rho_{u_1 u_2} = \frac{1}{T_0} \int_0^{T_0} \chi_{u_1}(t) \chi_{u_2}^*(t) dt \quad (9)$$

$$= \frac{1}{T_0} \int_0^{T_0} \exp\left[j\beta \sum_{m=1}^{M} \sin(2\pi \kappa_{u_1 m} f_0 t)\right] \cdot \exp\left[-j\beta \sum_{n=1}^{M} \sin(2\pi \kappa_{u_2 n} f_0 t)\right] dt$$

In various embodiments of the invention wherein M is equal to 1, each of the bracketed terms in (9) may be expanded into a complex Fourier series resulting in the correlation coefficient between the waveforms $\chi_u(t)$ and $\chi_v(t)$ given by $$\rho_{uv} = \frac{1}{T_0} \int_0^{T_0} \left\{ J_m(\beta) \sum_{m=-\infty}^{\infty} \exp[j2\pi m \kappa_u f_0 t] \right\} \quad (10)$$

$$\left\{ J_n(-\beta) \sum_{n=-\infty}^{\infty} \exp[j2\pi n \kappa_v f_0 t] \right\} dt$$

In (10) $J_n(\beta)$ is the Bessel function of order n and $κ_u$ and $κ_v$ are the normalized frequencies $(f_u/f_0)$ and $(f_v/f_0)$ of the waveforms $\psi_u(t)$ and $\psi_v(t)$ respectively for the FHFMSS transmitters with corresponding indices u and v. With the substitution of $J_n(-\beta)=J_{-n}(\beta)$, the correlation coefficient $\rho_{u,v}$ in (10) may be rewritten as $$\rho_{uv} = \frac{1}{T_0} \int_0^{T_0} \sum_{m=-\infty}^{\infty} \sum_{n=-\infty}^{\infty} J_m(\beta) J_n(\beta) \exp[j2\pi(m\kappa_u - n\kappa_v) f_0 t] dt \quad (11)$$

After combining the terms of the same frequency, the expression for the correlation coefficient $\rho_{u,v}$ in (11) may be simplified as $$\rho_{uv} = \sum_{m=-\infty}^{\infty} H_m(\beta) \frac{1}{T_0} \int_0^{T_0} \exp[j2\pi m f_0 t] dt = H_0(\beta) \quad (12)$$

In (12) $H_m(\beta)$ is a summation of the products of the Bessel functions. For example $H_0(\beta)$ is given by $$H_0(\beta) = \sum_{m=-\infty}^{\infty} \int_{\substack{n=-\infty; \\ n\kappa_v = m\kappa_u}}^{\infty} J_m(\beta) J_n(\beta) \quad (13)$$

The second equality in (12) follows form the fact that the integral in (12) for any non zero integer m is equal to 0.

In various embodiments of the invention the κ coefficients $κ_u$ and $κ_v$ may be selected to be prime integers. Selection of the prime integer κ coefficients $κ_u$ and $κ_v$ results in most of the summation terms in (13) to be zero except those satisfying the condition that n and m are integer multiples of $κ_u$ and $κ_v$ respectively. For example, with $κ_u=7$ and $κ_v=11$, the integers m and n must be multiples of 11 and 7 respectively. For a given modulation index β, the magnitude of the function $J_m(\beta)$ as a function of the index m is bounded by a monotone decreasing function of m with $J_m(\beta)$ being relatively small in magnitude for the index m much higher than β. Under such condition, $H_0(\beta)$ in (13) may be approximated by $$\rho_{uv} = H_0(\beta) \approx J_0^2(\beta) \quad (14)$$

With a selection of β equal to a zero of the equation $J_0(x)=0$, $H_0(\beta)$ in (13) is nearly equal to 0 with the result that the correlation coefficient between the two FHFM waveforms $\rho_{u,v}$ in (9) is nearly equal to 0 showing that the two FHFM waveforms $\chi_u(t)$ and $\chi_v(t)$ are nearly orthogonal.

An evaluation of the correlation coefficient from (9) for the case of M equal to 1 shows that (14) provides a very good estimate of the correlation coefficients. For example, with $N_u=9$, the set of $N_f=9$ normalized frequencies $κ_n=(f_n/f_0)$ given by $S_f=[5\ 7\ 11\ 13\ 17\ 19\ 23\ 29\ 31]$, and the modulation index β selected to be 2.4048, that is nearly equal to the first zero of the Bessel function $J_0(\ )$, the correlation coefficients are all close to 0. With β=2.4048, $J_0(\beta)=1.32\times10^{-5}$ and all of the 36 but one correlation coefficients $\rho_{u,v}$ are equal to $1.78\times10^{-10}$ in good agreement with the approximation in (9). The remaining $36^{th}$ coefficient is equal to $3.78\times10^{-10}$. With β=2.4, $J_0(\beta)=0.0025$ and the correlation coefficients are equal to $6.29\times10^{-6}$ compared to the value $6.25\times10^{-6}$ from the approximation (14). For the case of β equal to one of the zeros of the Bessel function $J_0(\ )$, and M=1, the waveforms $\chi_u(t)$ in (8) are orthogonal waveforms over the interval (0, $T_0$).

For the case of M>1, the $N_u$ waveforms $\chi_u(t)$ in (8) may be nearly orthogonal. In various multiple accessing embodiments of the invention, a subset of all possible M-tuples may be selected for minimizing the multiple access interference power resulting from non zero correlation coefficients. For example with $N_f=9$ normalized frequencies given by the set $S_f$ and M=2, the number of all distinct frequency pairs is equal to $$N = \frac{!9}{!2!7} = 36.$$

Due to non zero correlation coefficients $\rho_{i,j}$ the total interference power for the user with the frequency pair i is given by $$P_{I,i} = \sum_{\substack{j=1 \\ j \neq i}}^{N} |\rho_{ij}|^2.$$

With the signal power $P_s$ equal to 1, a correlation detection of the FHFMSS signals results in the signal to total interference power ratio given by $(Ps/P_{I,i})$ and the normalized interference power $(P_{I,i}/Ps) = P_{I,i}$.

By eliminating the frequency pairs for which the normalized interference power $(P_{I,i})$ is relatively high, the normalized interference power for the users with the remaining frequency pairs may be reduced. The process of elimination maybe performed in a recursive manner wherein a frequency pair corresponding to the highest normalized interference power $(P_{I,i})$ is eliminated from the set of N frequency pairs with the computation of the normalized interference power $(P_{I,i})$ performed for the remaining (N-1) frequency pairs. The procedure may be repeated a specified integer $N_E$ times resulting in $N_u = (N - N_E)$ frequency pairs with the minimum normalized interference power.

Figure 1B:
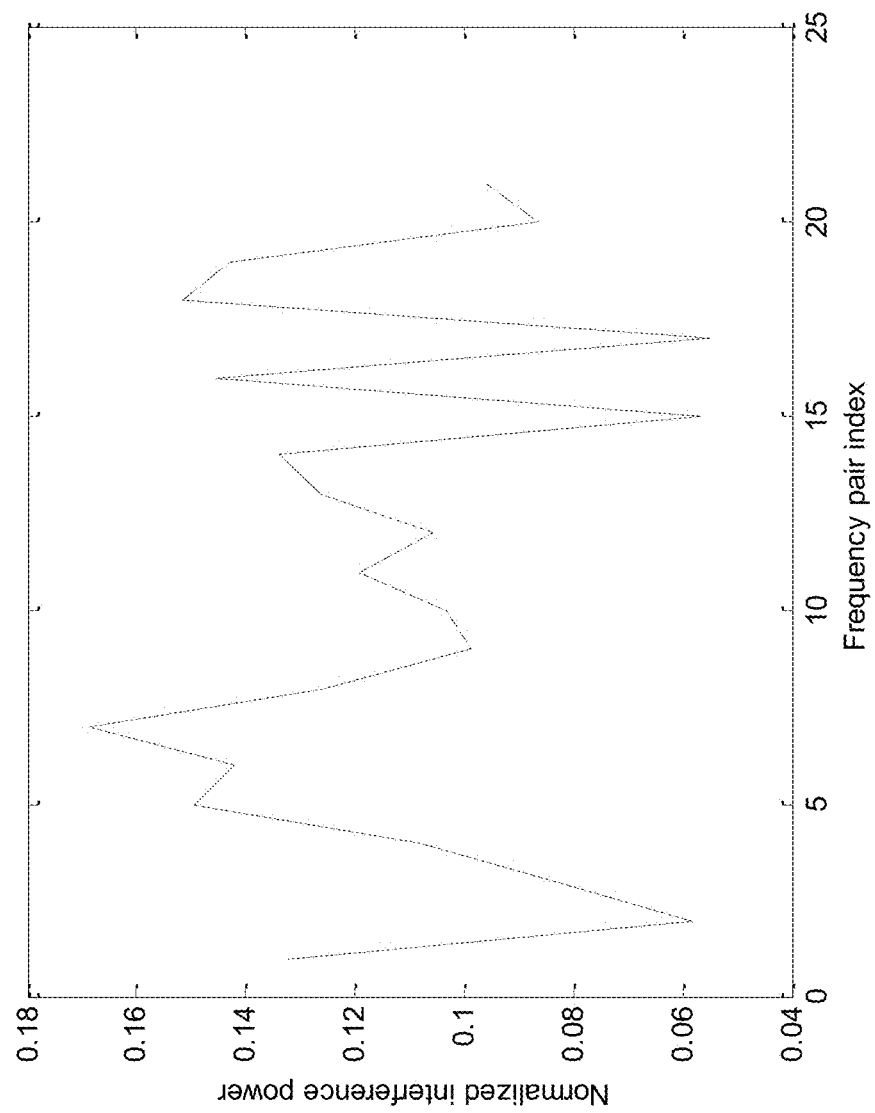
FIG. 1B shows a plot of normalized interference power versus frequency pair indices.

FIG. 1B shows the normalized interference power $(P_{I,i})$ for the case of M=2, $N_f=9$ and $N_E=15$ with $N_u=21$, $\beta=2.4048$ and the set of normalized frequencies $S_f$ given by [5 7 11 13 17 19 23 29 31]. The indices $i_1$ and $i_2$ in the set $S_f$ of the normalized frequencies $\kappa_1$ and $\kappa_2$ in the $N_u$ pairs of frequencies are given by Table 1. For example, the first pair in Table 1 has indices $i_1=1$ and $i_2=2$ with the normalized frequencies $\kappa_1=5$ and $\kappa_2=7$. From FIG. 1, the mean normalized interference power is equal to 0.1138.

TABLE 1

Indices in the set $S_f$ of the normalized frequencies of $N_u$ = 21 frequency pairs

| $i_1$ | 1 | 1 | 1 | 1 | 1 | 1 | 2 | 2 | 2 | 3 | 3 | 3 | 4 | 4 | 4 | 5 | 5 | 6 | 6 | 7 | 8 |
|---|---|---|---|---|---|---|---|---|---|---|---|---|---|---|---|---|---|---|---|---|---|
| $i_2$ | 2 | 3 | 4 | 5 | 8 | 9 | 6 | 7 | 9 | 5 | 8 | 9 | 5 | 7 | 9 | 8 | 9 | 7 | 9 | 9 | 9 |

Figure 1C:
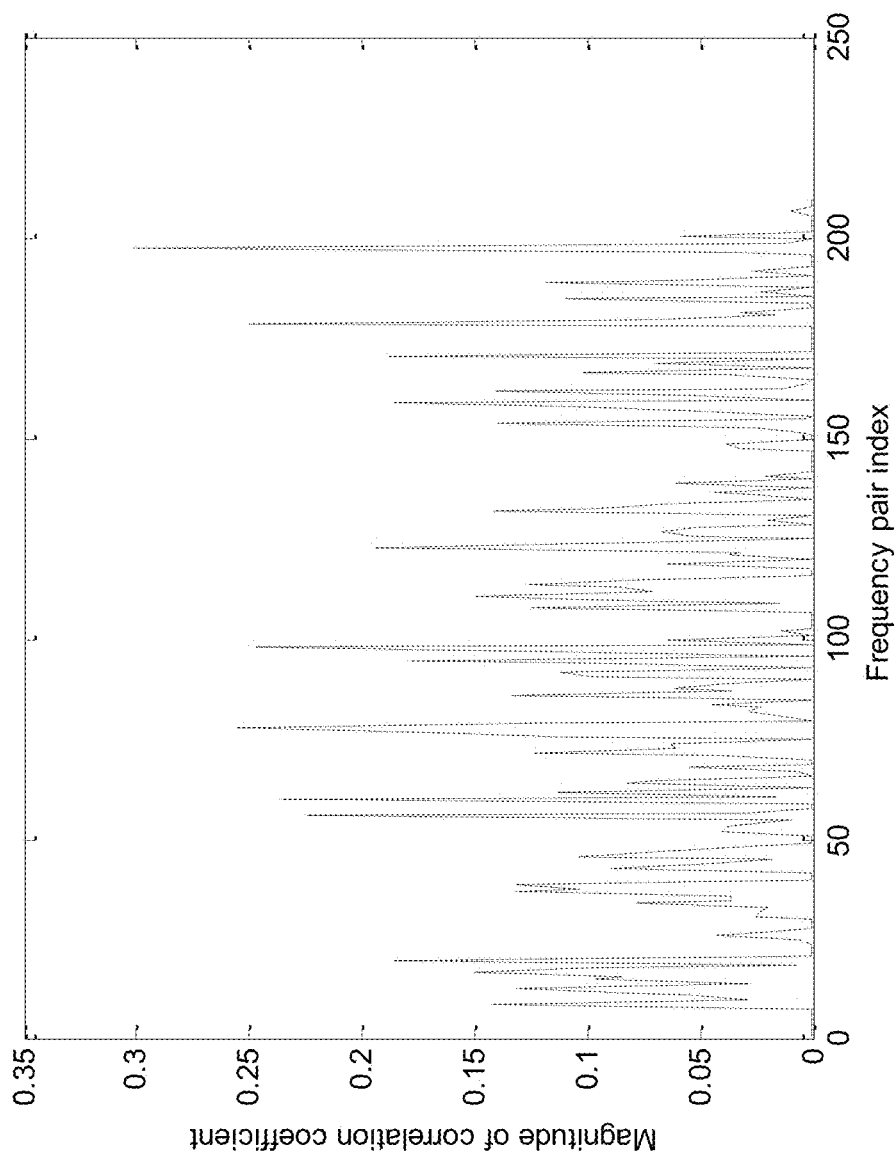
FIG. 1C shows a plot of magnitude of the correlation coefficient versus frequency pair indices.
Figure 1D:
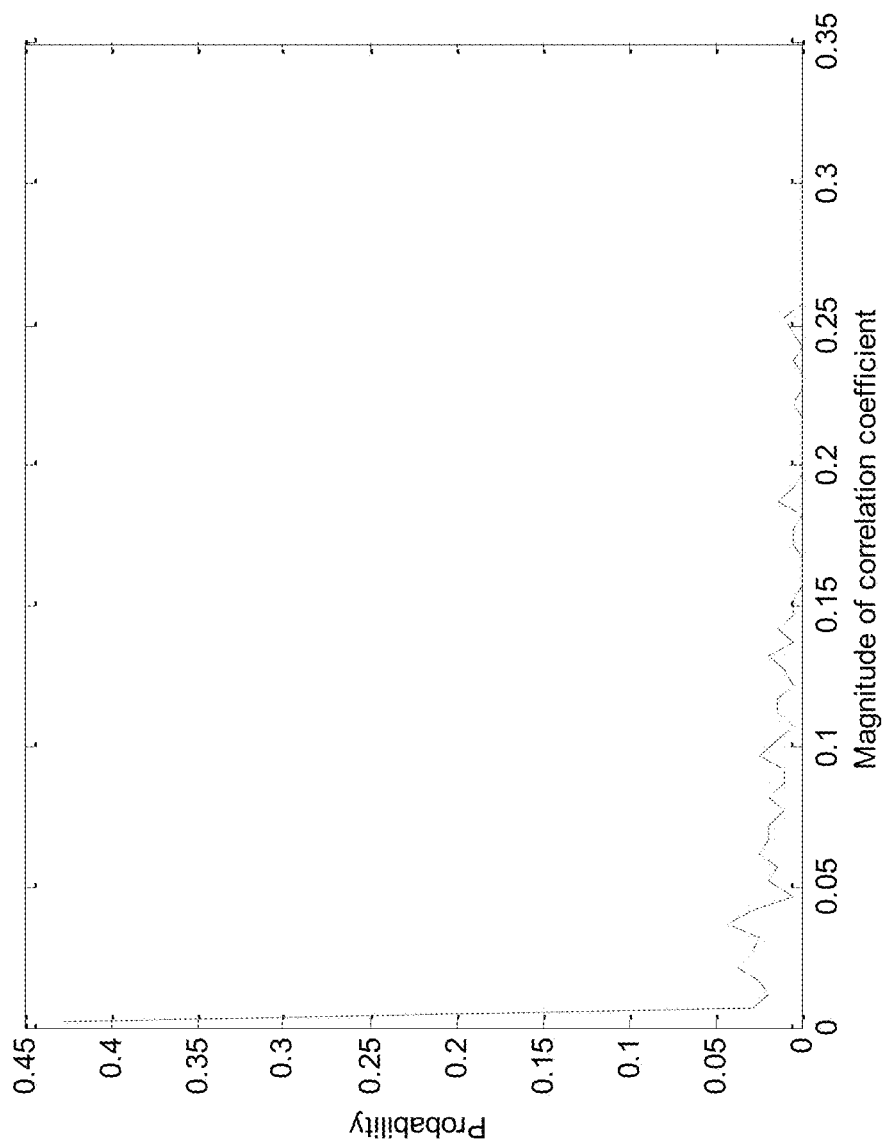
FIG. 1D shows a plot of the probability distribution of magnitude of the correlation coefficient.

FIG. 1C shows the plot of the magnitudes of the $N_u(N_u-1)/2=210$ correlation coefficients among the signals $\chi_u(t)$ corresponding to the selected $N_u=21$ frequency pairs. FIG. 1D plots the probability distribution of the magnitudes of the 210 correlation coefficients. As may be inferred from FIG. 1D, most of the correlation coefficients are less than 0.05 in magnitude.

Figure 1E:
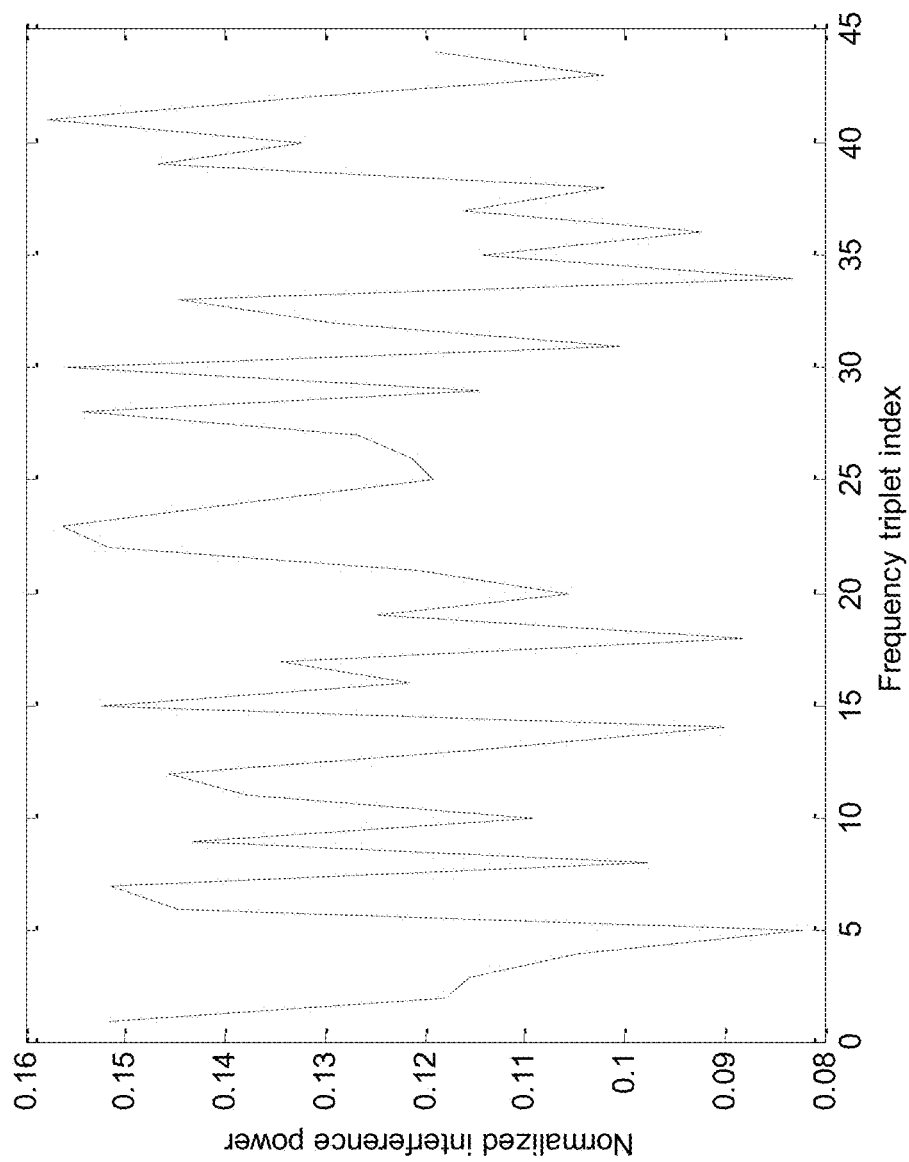
FIG. 1E shows a plot of normalized interference power versus frequency triplet indices.

In an alternative embodiment of the invention the number of tones M may be selected equal to 3. As an example of the M=3 case, FIG. 1E shows the normalized interference power $(P_{I,i})$ for the case of M=3, $N_f=9$, N=84, and $N_E=40$ with $N_u=44$, $\beta=5.52$ and the set of normalized frequencies $S_f$ given by [5 7 11 13 17 19 23 29 31]. The $N_u=44$ frequency triplets are selected from a totality of N=84 possible distinct frequency triplets by minimization of the normalized interference power as for the case of M=2. The mean value of the normalized interference power for the users assigned the $N_u$ frequency triplets is equal to 0.1242. The interference power may be further reduced by increasing $N_E$ beyond 40. Alternatively $N_u$ may be increased at the cost of some increase in the interference power. In various embodiments of the invention, the multiple access interference may be reduced to nearly 0 for the case of M>1 by selecting the code vector sequences $c_2(t), c_3(t), \ldots, c_M(t)$ to be the same for all of the $N_u$ multiple accessing users with the $c_1(t)$ sequence different for the various users.

Figure 1F:
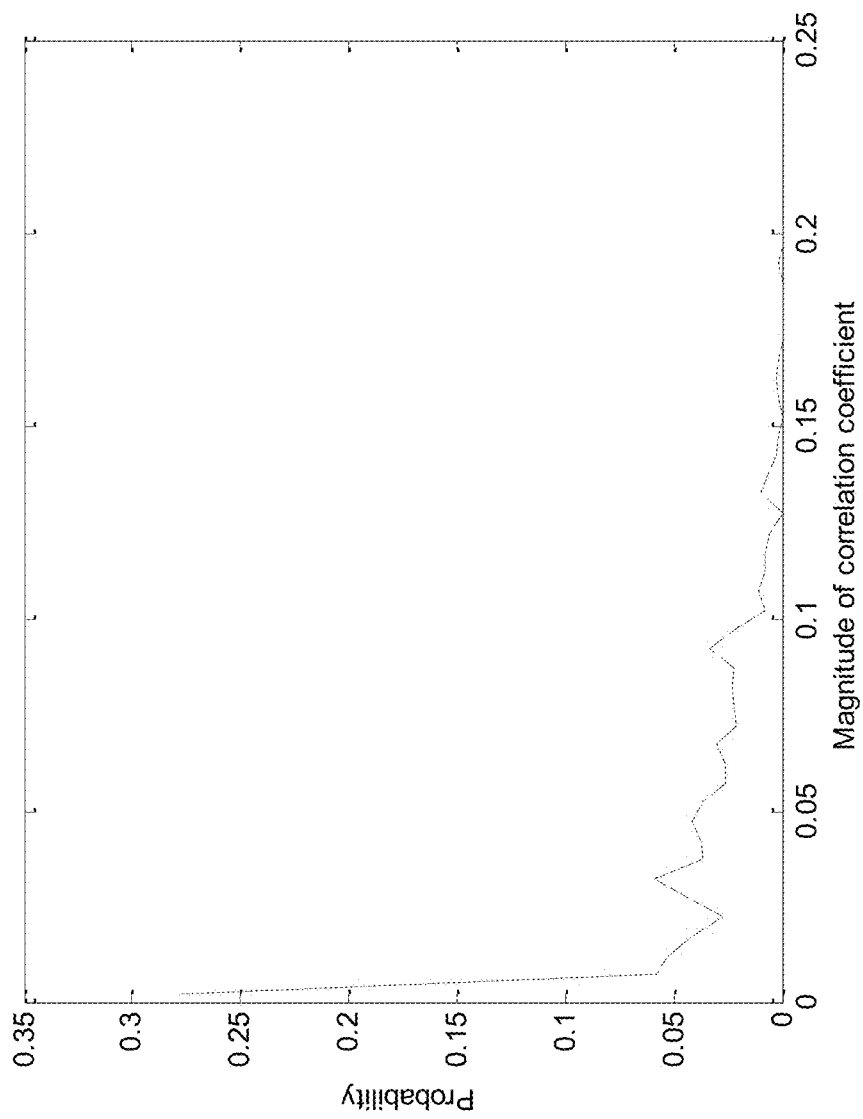
FIG. 1F shows a plot of the probability distribution of magnitude of the correlation coefficient.

FIG. 1F plots the probability distribution of the magnitudes of the $N_u(N_u-1)/2=946$ correlation coefficients. As may be inferred from FIG. 1F, most of the correlation coefficients are less than 0.1 in magnitude.

Figure 1G:
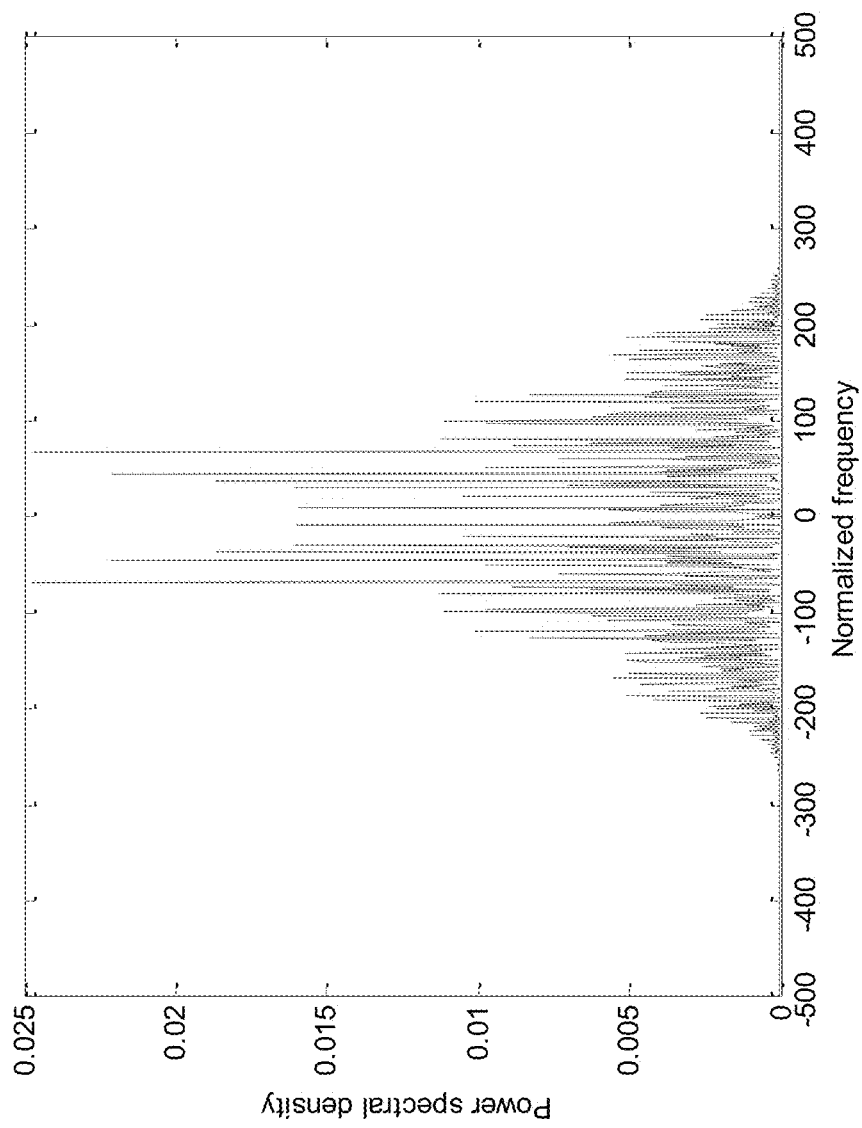
FIG. 1G shows a plot of the power spectral density of one embodiment of FHFM (Frequency Hopped Frequency Modulation) waveform.

FIG. 1G plots the power spectral density of the FHFM waveform $\chi_u(t)$ corresponding to one of the selected $N_u$ normalized frequency triplets with indices in the set $S_f$ equal to [1 4 7] for the case of M=3 with $\kappa_1=5$, $\kappa_2=13$ and $\kappa_3=23$. The power spectral density is comprised of impulse functions at frequencies that are integer multiples of the frequency $f_0$. FIG. 1G shows the magnitudes of the impulse functions versus the normalized frequency $(f/f_0)$. The sum of magnitudes of the impulse functions is equal to the average signal power of the waveform that is equal to 1.

Figure 1H:
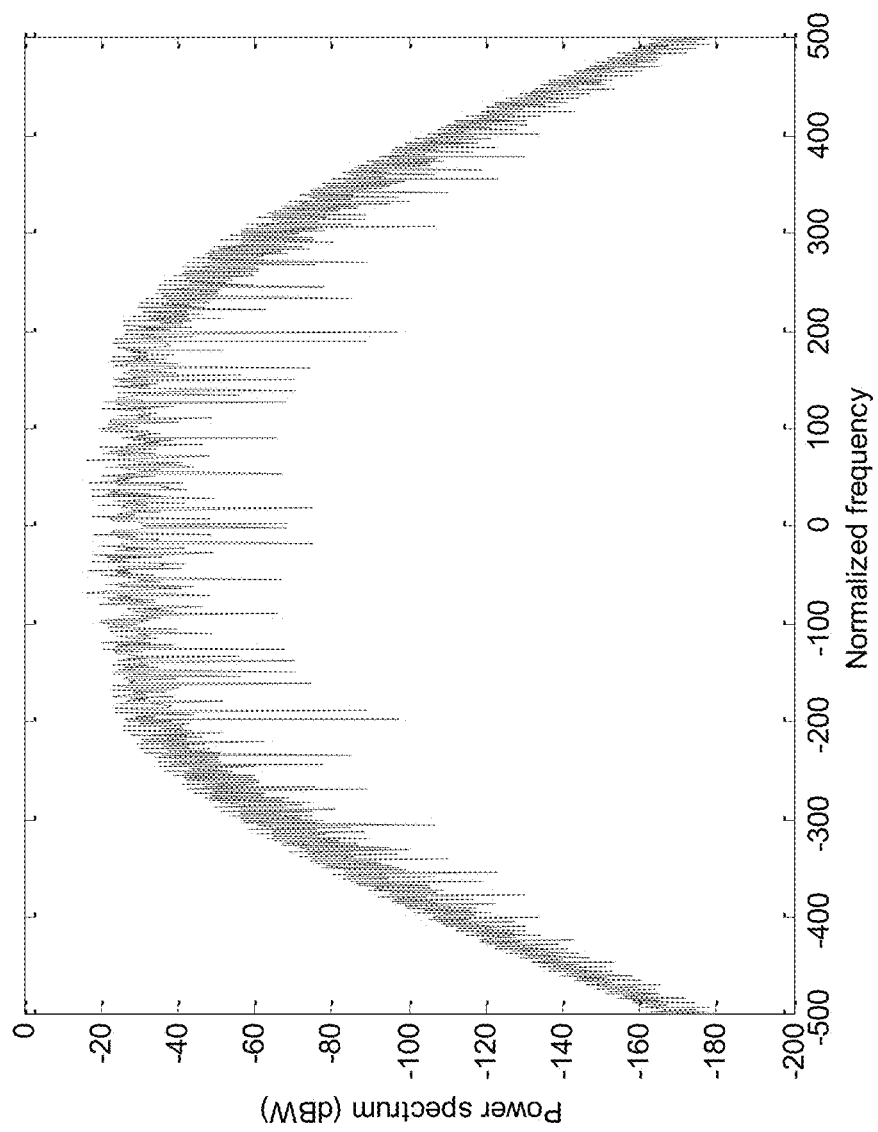
FIG. 1H shows a plot of the power spectral density in dBW of one embodiment of FHFM waveform.
Figure 1J:
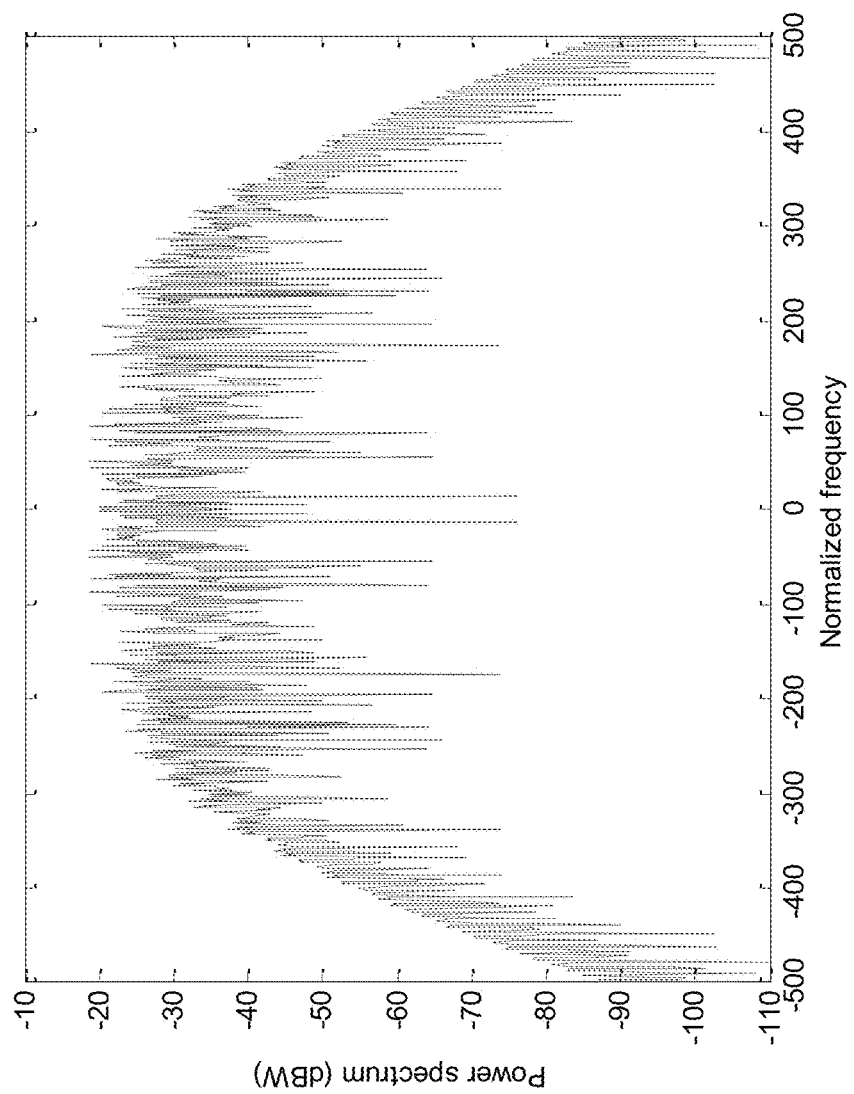
FIG. 1J shows a plot of the power spectral density in dBW of one embodiment of FHFM waveform.

FIG. 1H and 1J respectively show the plots of the power spectral density in dBW for a selected pair of the FHFM waveforms corresponding to the normalized frequency triplets equal to [5 13 23] and [5 23 29] respectively for the case of M=3. As may be observed for FIGS. 1H and 1J, the signal power spectral density is spread over the entire signal bandwidth that may be approximated by Carson's rule wherein the one sided bandwidth is approximately equal to $(\Delta f + f_{max})$ wherein $\Delta f$ is the peak frequency deviation in Hz and $f_{max}$ is the maximum modulation frequency. For the case of FIG. 1H, $\kappa_m=23$ with $f_{max}=23f_0$, the bandwidth by Carson's rule is equal to $249.3f_0$ compared to 99.9% power bandwidth of 242 $f_0$ evaluated from the power spectral density of the FHFM waveform. For the case of FIG. 1J, $\kappa_m=29$ with $f_{max}=29f_0$, the bandwidth by Carson's rule is equal to $343.6f_0$ compare to 99.9% power bandwidth of 309 $f_0$ evaluated from the power spectral density of the FHFM waveform. Bandwidth approximation based on Carson's rule is somewhat more conservative than the evaluated power bandwidth due to the dense nature of the power spectral density of the FHFM waveform.

Figure 1K:
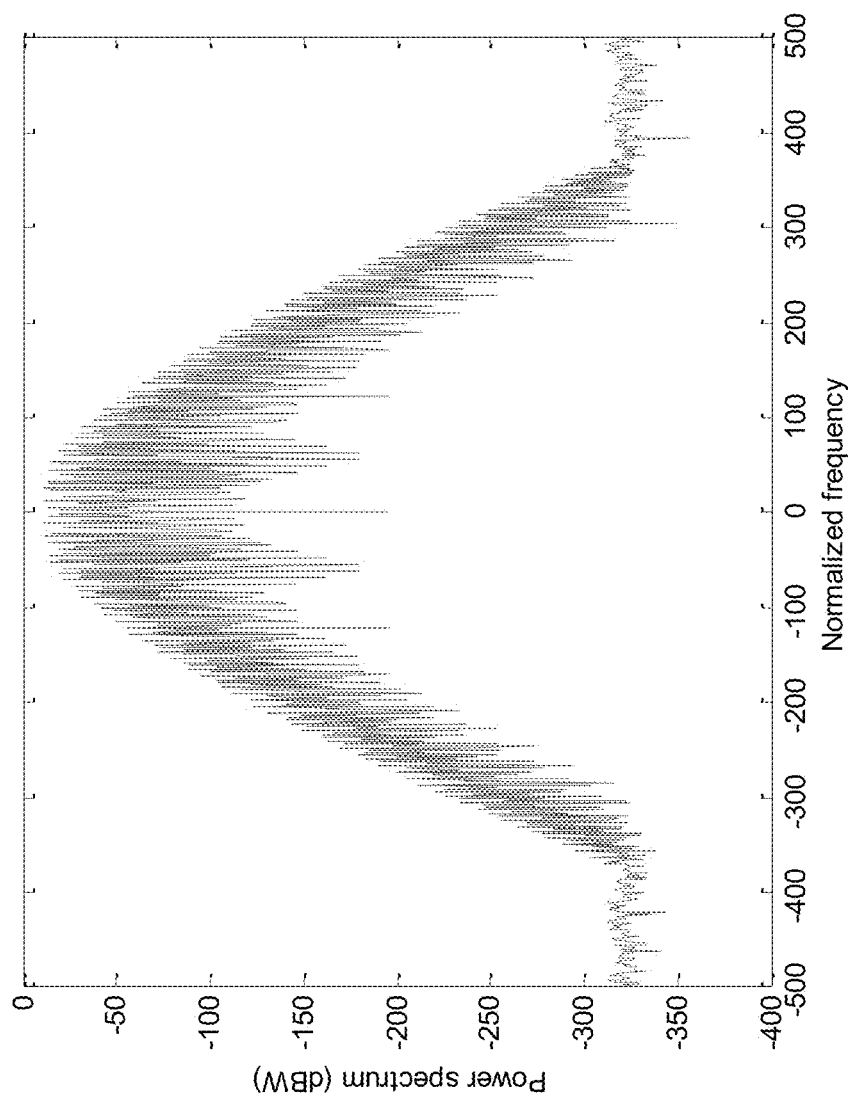
FIG. 1K shows a plot of the power spectral density in dBW of one embodiment of FHFM waveform.

FIG. 1K shows the plot of the power spectral density in dBW versus normalized frequency for a FHFM waveforms corresponding to the indices in the set $S_f$ of the normalized frequency pair given by [2 6] for the case of M=2 and $N_f=9$, N=36, and $N_E=15$ with $N_u=21$, $\beta=2.4048$ and the set of normalized frequencies $S_f$ given by [5 7 11 13 17 19 23 29 31]. The bandwidth estimate by Carson's rule is equal to 81.5 $f_0$ that is nearly equal to the corresponding 99.5% power bandwidth of $82f_0$ evaluated from the power spectral density of the FHFM waveform.

The power spectral density (PSD) of the FHFM waveform of user u for the case of M=1, not shown, is a sparse function of the frequency in that the PSD has discrete spectral lines only at the integer multiples of the frequency $\kappa_u f_0$ where $\kappa_u$ is the normalized frequency of the $\psi_u$-waveform of the user u. For example with $\kappa_u=19$, the power spectral density has discrete spectral lines only at the frequencies $19f_0, 38f_0, \ldots$. Increasing the value of M results in making the power spectral density of the FHFM waveform a more dense function of the frequency.

Figure 2:
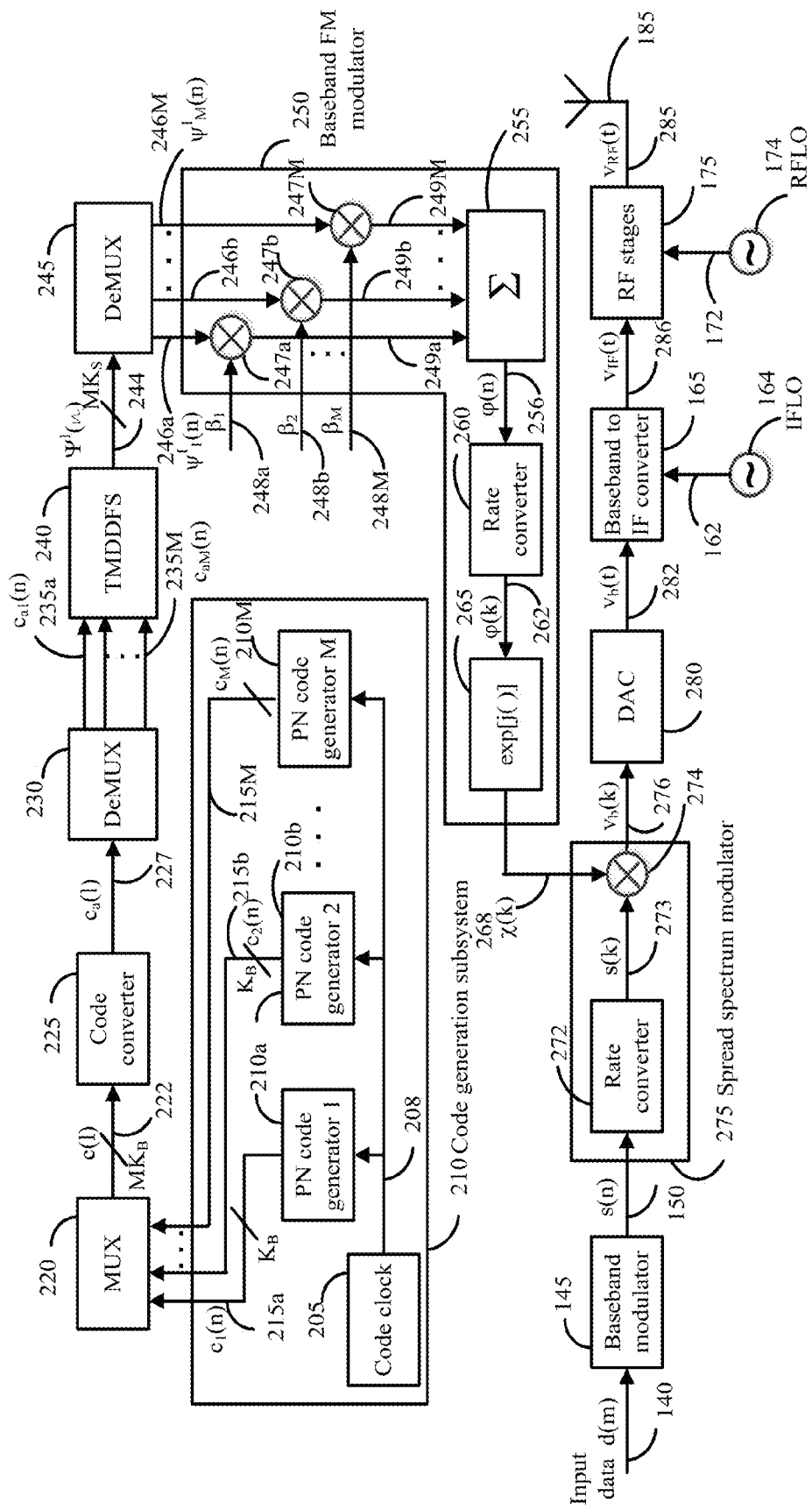
FIG. 2 shows a block diagram of one embodiment of FHFMSS transmitter.

FIG. 2 shows the block diagram of an alternative embodiment of the FHFMSS transmitter of the invention. Referring to the FHFMSS transmitter 200 in FIG. 2, the input data 140 d(m) is inputted to the baseband modulator 145. The data 140 d(m) may be binary valued taking values 0 and 1, wherein m denotes the discrete time. In various embodiments of the invention, the transmitter may be located at the base station of a mobile network and the data d(m) may be destined for a mobile user in the cell served by the base station. In various other embodiments of the invention, the transmitter may be part of the mobile user equipment with a plurality of data streams destined to the same base station, wherein the plurality of the data streams may be combined in to a single data stream d(m) by a parallel to serial converter, not shown in FIG. 2.

The baseband modulator 145 segments the user input data 140 d(m) into groups of m binary valued data bits and maps each of the groups of the m binary data bits into one of the $M=2^m$, in general complex valued, information baseband symbols 150 s(n), n denotes discrete time index, with m selected equal to an integer greater than or equal to 1. The one to one mapping of the groups of m binary valued data bits into the corresponding baseband symbol may be based on any of the baseband modulation techniques, selected, for example, from the set of the MQAM (Multiple Quadrature Amplitude Modulation), the MPSK (Multiple Phase Shift Keying), and the MASK (Multiple Amplitude Shift Keying) modulation techniques. In various embodiments of the invention, the baseband modulator may also be comprised of an error correction code encoder and an interleaver.

Referring to FIG. 2, the code generation subsystem 210 is comprised of code clock unit 205 for providing a clock signal 208 at the clock rate of $f_0$. In various alternative embodiments of the invention, the clock rate of the clock signal 208 may be an integer sub multiple of $f_o$. Referring to FIG. 2, in some embodiments of the invention, the clock rate signal inputted to the multiplicity M code generators may be different. Referring to FIG. 2, the code clock signal 208 is provided to a multiplicity M of PN code generators 210 a, ... 210M for generating a multiplicity M binary valued code vector sequences 215a through 215M $c_1(n)$, $c_2(n)$, $c_M(n)$. Throughout this application, the notations 1, 2, ..., N, or a, b, N, or a through N are all equivalent and denote the enumeration of integers 1 to N for any integer N. Each of the code vectors 215 a through M is of dimension $K_B$ wherein each component of the vectors $c_i(n)$, $1 \leq i \leq M$ may take values 0 and 1 and n denotes discrete time index. The dimension $K_B$ is selected such that $2^{K_B} \geq N_f$ wherein $N_f$ is the number of periodic ψ-waveforms or the number of frequencies when the ψ-waveforms are selected to be the sinusoidal waveforms.

In various embodiments of the invention, the code generators 215 may be implemented with feedback shift registers of length $N_B$ with $K_B$ of the $N_B$ stages' outputs of the feedback shift register comprising the $K_B$ elements of the code vectors $c_i(n)$ termed sub state code vectors. Different code sequences may be generated by using different feedback connections in the feedback shift registers. In various embodiments of the invention the multiplicity M binary valued code vector sequences 215a through 215M $c_1(n)$, $c_2(n)$, $c_M(n)$ may be generated as appropriate delayed versions of a single sequence binary valued code vector sequences $c_1(n)$.

In various multiple access systems embodiments of the invention, the multiple access interference may be reduced to approximately 0 for M>1 by selecting the code vector sequences $c_2(n)$, $c_3(n)$, ..., $c_M(n)$ to be the same for the multiplicity $N_u$ multiple access users with different code sequences $c_1(n)$ for different users wherein the different code sequences $c_1(n)$ are mapped into the same set $S_1$ of the frequency selection indices. The sets of frequency selection indices corresponding to the multiplicity M code sequences may be all disjoint sets. Such an assignment of the code vector and frequency selection indices to the multiplicity $N_u$ multiple access users results in the correlation coefficient among any pair of the FHFM waveforms $\chi_u(t)$ and $\chi_v(t)$ with a corresponding pair of M tuples of the ψ-waveforms for a pair of multiple access users u and v to be equal to the correlation coefficient of a corresponding pair of $\chi(t)$ waveforms each with only a single ψ-waveform that are distinct resulting in an approximately 0 correlation coefficient. Approximately 0 correlation coefficient between the FHFM waveforms may thus be achieved while the FHFM waveforms possess a dense power spectral density function.

Referring to FIG. 2, the multiplicity M code vector sequences 215a through 215M $c_1(n)$, $c_2(n)$, $c_M(n)$ are inputted to the multiplexer 220 that time multiplexes the M inputs in to a single multiplexed code vector sequence 222 c(l) wherein l is the discrete time index. A multiplicity of different symbols to designate the discrete time index may refer to different time scales in various discrete time sequences. Referring to FIG. 2, the multiplexed code vector sequence 222 c(l) is inputted to a code converter unit 225. The code converter unit 225 may map the 1 out of $2^{K_B}$ possible set of values taken by the elements of the multiplexed code vector 222 c(l) into a $K_F$ bit frequency selection indices with a one to one correspondence providing the output frequency selection indices sequence 227 $c_a(l)$.

In various embodiments of the invention, the frequency selection indices may be selected from the set of normalized frequencies $\kappa_n = f_n/f_0$ in the set $S_f$ and the number of bits $K_F$ may be selected such that $2^{K_F} \geq \kappa_{max}$ wherein $\kappa_{max}$ is the maximum normalized frequency in the set $S_f$ for the case of sinusoidal waveforms $\psi_n(t)$. In various embodiments of the invention, the multiplicity M code vector sequences may be mapped into disjoint sets of frequency selection indices by the code converter. The frequency selection indices may be selected from the set of prime integers. The mapping of the code vectors into a frequency selection index may be performed by a table look up.

Referring to FIG. 2, the frequency selection indices sequence 227 $c_a(l)$ is inputted to the demultiplexer 230. The demultiplexer 230 time demultiplexes the input frequency selection indices sequence into the multiplicity M frequency selection indices subsequences $c_{a_i}(n)$, i=1, 2, ..., M.

Referring to FIG. 2, the multiplicity M frequency selection indices subsequences $c_{a_1}(n)$, $c_{a_2}(n)$, ..., $c_{a_M}(n)$ 235a, b, ..., M are inputted to the time multiplexed direct digital multi frequency synthesizer (TMDDFS) 240. The multi frequency synthesizer 240 generates a discrete time waveform $\psi^I(\eta)$ that is a time multiplexed version of the multiplicity M waveforms $\psi_1^I(\eta)$, $\psi_2^I(\eta)$, ..., $\psi_M^I(\eta)$ with η denoting the time index and $\psi_i^I(\eta)$ is the discrete time version with $K_s$ number of bits per sample of the waveform $\psi_i^I(t)$ given by $$\psi_i^I(t) = \alpha_i \int_{-\infty}^{t} \psi_i(\tau) d\tau; \; i = 1, 2, \ldots M \quad (15)$$

In (15) $\alpha_i$ is a scale factor selected such that the peak magnitude of the waveform $\psi_i^I(t)$ is equal to 1.

In various embodiments of the invention the waveform $\psi_i(t)$ and $\psi_i^I(t)$ may be sinusoidal waveform with their possibly time varying frequencies selected from 1 out of $2^{K_B}$ possible values based on the $2^{K_B}$ possible values taken by the elements of the corresponding code vector $c_i(l)$ for i equal to 1 through M. For example with $K_B=8$, the number of distinct frequencies of the waveforms $\psi_i(t)$ may be equal to 64. In various other embodiments of the invention waveforms $\psi_i(t)$ may be different from the sinusoidal waveforms. In various alternative embodiments of the invention, the multiplicity M waveforms $\psi_1^I(\eta), \psi_2^I(\eta), \ldots, \psi_M^I(\eta)$ may be generated by one of the various frequency synthesizers such as the indirect frequency synthesizer based on phase lock loops, direct synthesizers, etc.

Referring to FIG. 2, the discrete time waveform 244 $\psi^I(\eta)$ is inputted to the demultiplexer 245. The demultiplexer 245 time demultiplexes the waveform 244 $\psi^I(\eta)$ into multiplicity M discrete time waveforms 246a, b, . . . , M $\psi_1^I(n), \psi_2^I(n), \ldots, \psi_M^I(n)$. Referring to FIG. 2, the multiplicity M discrete time waveforms 246a, b, M $\psi_1^I(n), \psi_2^I(n), \ldots, \psi_M^I(n)$ are inputted to the digital baseband FM (Frequency modulation) modulator 250. The baseband FM modulator 250 is provided with the mod indices 248a, b, . . . , M $\beta_1, \beta_2, \ldots, \beta_M$ corresponding to the waveforms $\psi_1(t), \psi_2(t), \ldots, \psi_M(t)$.

Referring to FIG. 2, the multiplicity M discrete time waveforms 246a, b, . . . , M $\psi_1^I(n), \psi_2^I(n), \ldots, \psi_M^I(n)$ are inputted to the scalar multipliers 247a,b, . . . , M that multiply the waveforms 246a, b, . . . , M by the respective mod indices 248a, b, M $\beta_1, \beta_2, \ldots, \beta_M$ providing the resulting scaled waveforms 249 a through M to the adder 255. The adder provides the resulting sum waveform 256 $\phi(n)$ to the rate converter unit 260. In various alternative embodiments wherein the mod indices $\beta_1, \beta_2, \ldots, \beta_M$ are all equal to the same mod index $\beta$, the multiplicity M discrete time waveforms 246a, b, M $\psi_1^I(n), \psi_2^I(n), \ldots, \psi_M^I(n)$ may be added first by the adder 255 followed by scalar multiplication by $\beta$ by a single scalar multiplier 248 for providing the waveform 256 $\phi(n)$ to the rate converter unit 260.

The sampling rate of various waveforms is determined by the bandwidths of the waveforms to avoid aliasing errors. According to Nyquist theorem the sampling rate must be at least two times the bandwidth of the waveform termed the Nyquist rate. For example, for the case of sinusoidal waveform $\psi_m(t)$ with frequency $f_m=\kappa_m f_0$, the sampling rate must be greater than or equal to $2\kappa_m$ per code chip period $T_0$. The sampling rate for the multiplicity M discrete time waveforms 246a, b, M $\psi_1^I(n), \psi_2^I(n), \ldots, \psi_M^I(n)$ may be selected to be $4\kappa_{max}$ per code chip period $T_0$ wherein $\kappa_{max}$ is the maximum normalized frequency. The bandwidth $B_s$ of the FHFM waveform $\chi(t)$ given by (5) may be estimated by Carson's rule as $B_s=(\Delta f+f_{max})$ where $\Delta f$ is the peak frequency deviation equal to $\beta(\kappa_1+\ldots+\kappa_M)f_0$, and $f_{max}=\kappa_m f_0$ is the maximum modulation frequency with $\kappa_m$ equal to the maximum of the normalized frequencies $\kappa_1, \ldots, \kappa_M$. The sampling rate of the FHFM waveform may be determined on the basis of an upper bound on the bandwidth $B_s=(1+M\beta)\kappa_{max}f_0$ and must be sampled at a rate greater than or equal to $2B_s$ samples/sec. Referring to FIG. 2, the rate converter unit 260 increases the sampling rate of the waveform 256 $\phi(n)$ by a factor of $\alpha(1+M\beta)$ wherein the scalar a depends upon the rates selected for the waveforms $\psi_m(t)$ and $\chi(t)$ and is equal to 1 if both the waveforms $\psi_m(t)$ and $\chi(t)$ are sampled at their respective Nyquist rates.

In various embodiments of the invention, the sampling rate of the waveforms for the multiplicity M discrete time 246a, b, M $\psi_1^I(n), \psi_2^I(n), \ldots, \psi_M^I(n)$ may be selected to be greater than or equal to the Nyquist rate of the waveform $\chi(t)$ eliminating the need for the rate converter 260. However, this will require the operation of the TMDDFS unit 240, the scalar multipliers 247 and the adder 255 at the increased sampling rate. Both the waveforms $\psi_m(t)$ and $\psi_m^I(n)$, m=1, 2, . . . , M are here to fore also referred to as the $\psi$-waveforms.

Referring to FIG. 2, the rate converted waveform 262 $\phi(k)$ is inputted to the exponential function unit 265 that provides the discrete time FHFM waveform 268 $\chi(k)$ with sampling period $t_s$ given by (16).

$$\chi(k) = \exp\left[j\sum_{n=1}^{M}\beta_n\sin(2\pi k f_n t_s)\right] \quad (16)$$

Referring to FIG. 2, the information baseband symbols 150 s(n) is inputted to the spread spectrum modulator 275 for modulation by the FHFM waveform 268 $\chi(k)$. Referring to FIG. 2, the information baseband symbols 150 s(n) is inputted to the rate converter unit 272 that increases the sampling rate of the information baseband symbols 150 s(n) from $R_s$ to the sampling rate of the FHFM waveform $\chi(k)$ that is greater than or equal to $2 B_S$ with $B_S$ equal to the bandwidth of the FHFM waveform. The rate converted symbol sequence 273 is inputted to the modulator 274. Referring to FIG. 2, the FHFM waveform 268 $\chi(k)$ is inputted to the modulator 274 for modulating the rate converted symbol sequence s(k) 273 providing the discrete time baseband FHFM spread spectrum signal 276 $v_b(k)$ given by $$v_b(k) = s(k)\cdot\chi(k) = s(k)\cdot\exp\left[j\sum_{n=1}^{M}\beta_n\sin(2\pi k f_n t_s)\right]; \, j=\sqrt{-1} \quad (17)$$

The power spectral density (PSD) of the baseband FHFM spread spectrum signal 276 $v_b(k)$ is given by the convolution of the PSD of the FHFM waveform with the PSD of the information baseband signal 150 s(m). The one sided bandwidth $B_{SS}$ of the spread spectrum signal 276 $v_b(k)$ is equal to the sum of the one sided bandwidth $B_S$ of the FHFM waveform and the one sided bandwidth $B_I$ of the information baseband symbol 150 s(m) wherein $B_S$ may be orders of magnitude higher than $B_I$. For any selected baseband modulation technique the bandwidth $B_I$ may be evaluated in terms of the symbol rate $R_s$. For example, for MQAM modulation $B_I$ is equal to $R_s$.

Referring to FIG. 2, the discrete time baseband FHFM spread spectrum signal 276 $v_b(k)$ is inputted to the digital to analog converter 280 for providing the baseband FHFMSS signal 282 $v_b(t)$ at the output.

Referring to FIG. 2, the baseband FHFMSS signal 282 $v_b(t)$ is inputted to the baseband to IF converter 165 that modulates the signal 282 $v_b(t)$ by the IF (Intermediate Frequency) local oscillator in phase and quadrature signals 162 $\cos(2\pi f_{IF}t)$ and $\sin(2\pi f_{IF}t)$ provided by the IF local oscillator (IFLO) 164 generating the IF FHFMSS band pass signal 286 $v_{IF}(t)$ given by $$v_{IF}(t)=\text{Re}\{v_b(t)\exp[j2\pi f_{IF}t]\}=\text{Re}(v_b(t))\cos(2\pi f_{IF}t)-\text{Im}(v_b(t))\sin(2\pi f_{IF}t) \quad (18)$$

In (18) $f_{IF}$ denotes the IF frequency and Re( ) and Im( ) denote the real part and imaginary part operators respectively. The baseband to IF converter unit 165 may also be comprised of a band limiting IF filter that may limit the bandwidth of the IF signal to be smaller than two times the 99.9% bandwidth $B_{SS}$ of the baseband FHFM spread spectrum signal $v_b(k)$.

Referring to FIG. 2, the IF FHFMSS band pass signal 286 $v_{IF}(t)$ is inputted to the RF stages block 175. The RF stages block is inputted by the RF local oscillator signal 172 provided by the RF local oscillator (RFLO) 174 and may be comprised of an up converter, an RF band pass filter and power amplifier providing the RF FHFMSS signal 285 $v_{RF}(t)$ to the antenna 185. The RF signal 285 is given by $$v_{RF}(t) = \sqrt{P_G} \operatorname{Re}\{v_b(t) \exp[j2\pi f_c t]\} \quad (19)$$

In (19) $f_c$ denotes the carrier frequency of the RF signal, and $P_G$ is the power gain of the RF stages unit 175.

Figure 3:
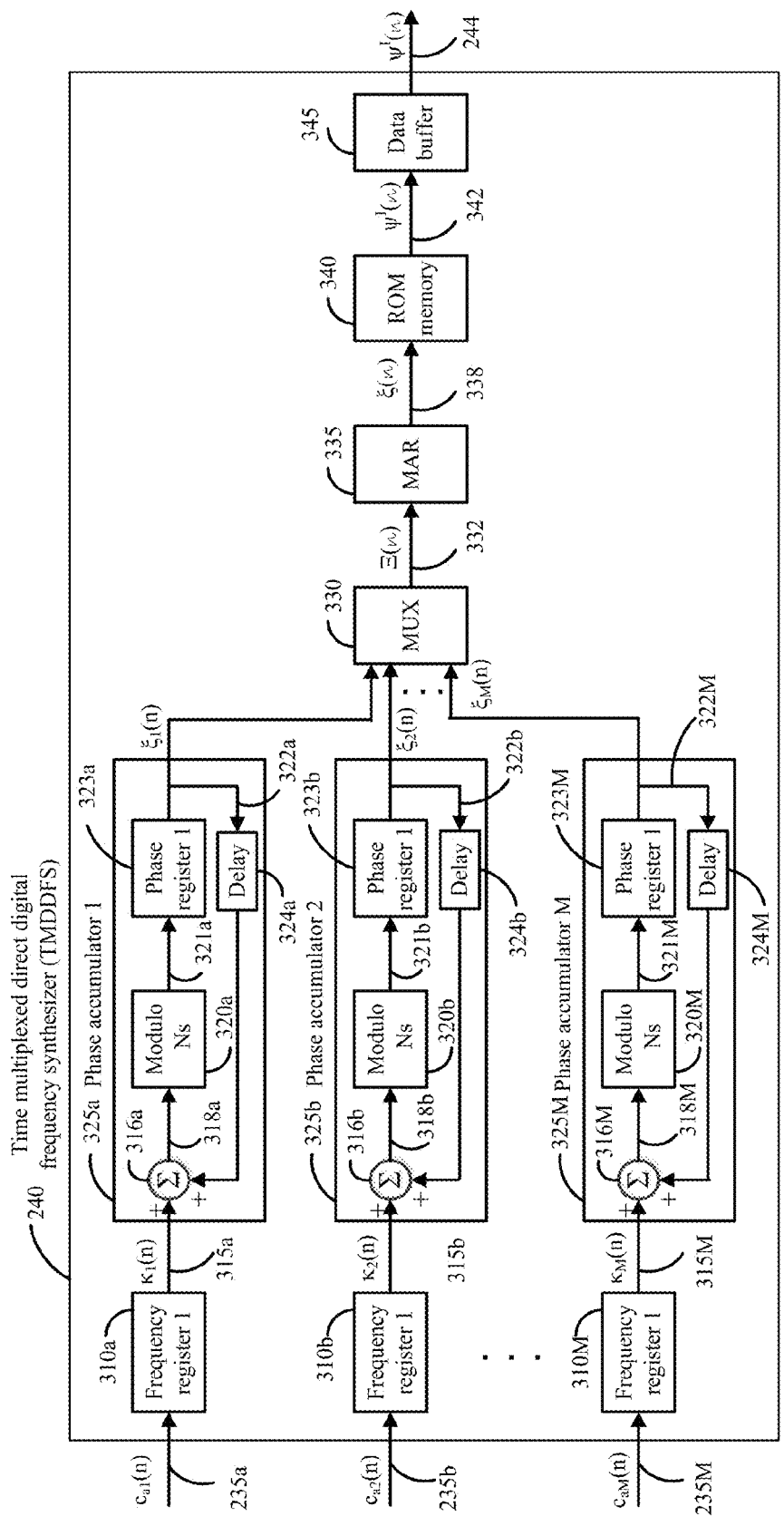
FIG. 3 shows a block diagram of one embodiment of time multiplexed direct digital frequency synthesizer (TMDDFS).

FIG. 3 is the block diagram of an embodiment of the time division direct digital frequency synthesizer (TMDDFS) 240. Referring to FIG. 3, the multiplicity M frequency selection indices subsequences 235a, M $c_{a_m}$ (n), m=1, 2, . . . , M are inputted to the respective ones of the frequency register blocks 310a, . . . , M of the TMDDFS 240. The frequency register block 310m, m=1, 2, . . . , M stores the frequency selection index 235m $c_{a_m}$ (n) held constant during any code chip period $T_c$ that may be equal to $T_0$. In various embodiments of the invention, the frequency selection index 235m $c_{a_m}$ (n) may be equal to the normalized frequency $\kappa_m$ during the $n^{th}$ code chip period. Referring to FIG. 3, the normalized frequency 315m $\kappa_m$ provided by the frequency register 310m is inputted to phase accumulator 325m. The phase accumulator 325m modulo $N_s$ accumulates the normalized frequency $\kappa_m$ at a sampling rate equal to the sampling rate of the ψ-waveforms that may be selected to be $N_s$ times the frequency $f_0$, wherein $N_s$ is an integer, providing the normalized accumulated phase 322m $\xi_m(n)$ at the output with n denting the time index at the sampling rate $N_s f_0$. Referring to FIG. 2, in various embodiments of the invention, the code clocks inputted to the PN code generators 210 a through M may have clock periods $T_c$ that are different integer multiples of $T_0$. In some embodiments of the invention, the period of the multiplicity M code vector sequences may be equal to 1 wherein the frequencies of the ψ-waveforms generated by the synthesizer do not very with time.

Referring to FIG. 3, the normalized frequency 315m $\kappa_m$ is inputted to the adder 316m. The output of the adder 316m is inputted to the modulo $N_s$ unit 320m. The modulo $N_s$ unit 320m performs the integer division of the input by the integer $N_s$ and provides the remainder at the output 321m to the phase register 323m. Referring to FIG. 3, the output of the phase register 323m is delayed by one sample time by the delay unit 324m with the delayed output provided to the adder 316m. With $N_s$ selected to be the integer multiple of $\kappa_m$, m=1, 2, . . . , M, during any period $T_0$ comprised of $N_s$ samples of the ψ-waveform, the phase accumulator 325m output is given by $$\xi_m(n) = \operatorname*{mod}_{N_s}(n\kappa_m); n = 0, 1, \ldots \quad (21)$$

For example, for the case of $\kappa_m = 1$ and $\kappa_m = 2$, $\zeta_m(n)$ sequence is given by $$\xi_m(n) = 0, 1, \ldots, N_s - 1, 0\ 1, \ldots; \kappa_m = 1 \quad (22a)$$

$$\xi_m(n) = 0, 2, \ldots, N_s - 2, 0\ 1, \ldots N_s - 2, 0, 2, \ldots; \kappa_m = 2 \quad (22b)$$

For $\kappa_m$ equal to any sub integer multiple m of $N_s$, there are m periods each of length $(N_s/m)$ during the $N_s$ samples at the output of the phase accumulator.

Referring to FIG. 3, the outputs 322m $\xi_m(n)$, m=1, 2, . . . , M of the multiplicity M phase accumulators 325 1 through M are inputted to the multiplexer 330. The multiplexer 330 time multiplexes the M outputs 322m $\xi_m(n)$ providing the multiplexed output 332 $\Theta(\eta)$ at a sampling rate of $MN_s f_0$ sps (samples per second). Referring to FIG. 3, the multiplexed output 332 $\Theta(\eta)$ is inputted to the memory address register (MAR) 335. The memory address register stores the multiplexer output 332 $\Theta(\eta)$ and may add a constant offset term, for example 1, providing the address 338 $\zeta(\eta)$ of the data stored in the ROM 340.

Referring to FIG. 3, the ROM memory unit 340 stores the data at $N_s$ locations with the content of the location at the address 338 $\zeta(\eta)$ given by $\sin(2\pi k/N_s)$ with k equal to the address 338 $\zeta(\eta)$ minus any offset introduced by the MAR, that is, the $N_s$ memory locations store the $N_s$ samples of one period of a sine wave of period $T_0$. Referring to FIG. 3, the output 342 $\Psi^I(\eta)$ of the ROM memory 340 is stored in the data buffer 345 that provides the multiplexed ψ waveform 244 $\Psi^I(\eta)$ at the output. The number of bits $K_S$ for each data word at any one of the memory addresses may be determined on the basis of the signal to quantization noise power ratio that is approximately given by $6K_S$ dB. For example, a selection of $K_S = 8$ results in 48 dB signal to quantization noise ratio. The number of samples $N_s$ may be selected to be an integer $v \geq 4$ times the maximum normalized frequency $\eta_{max}$. For example, with $\eta_{max} = 100$, a memory size of 400 words may be sufficient.

Figure 4:
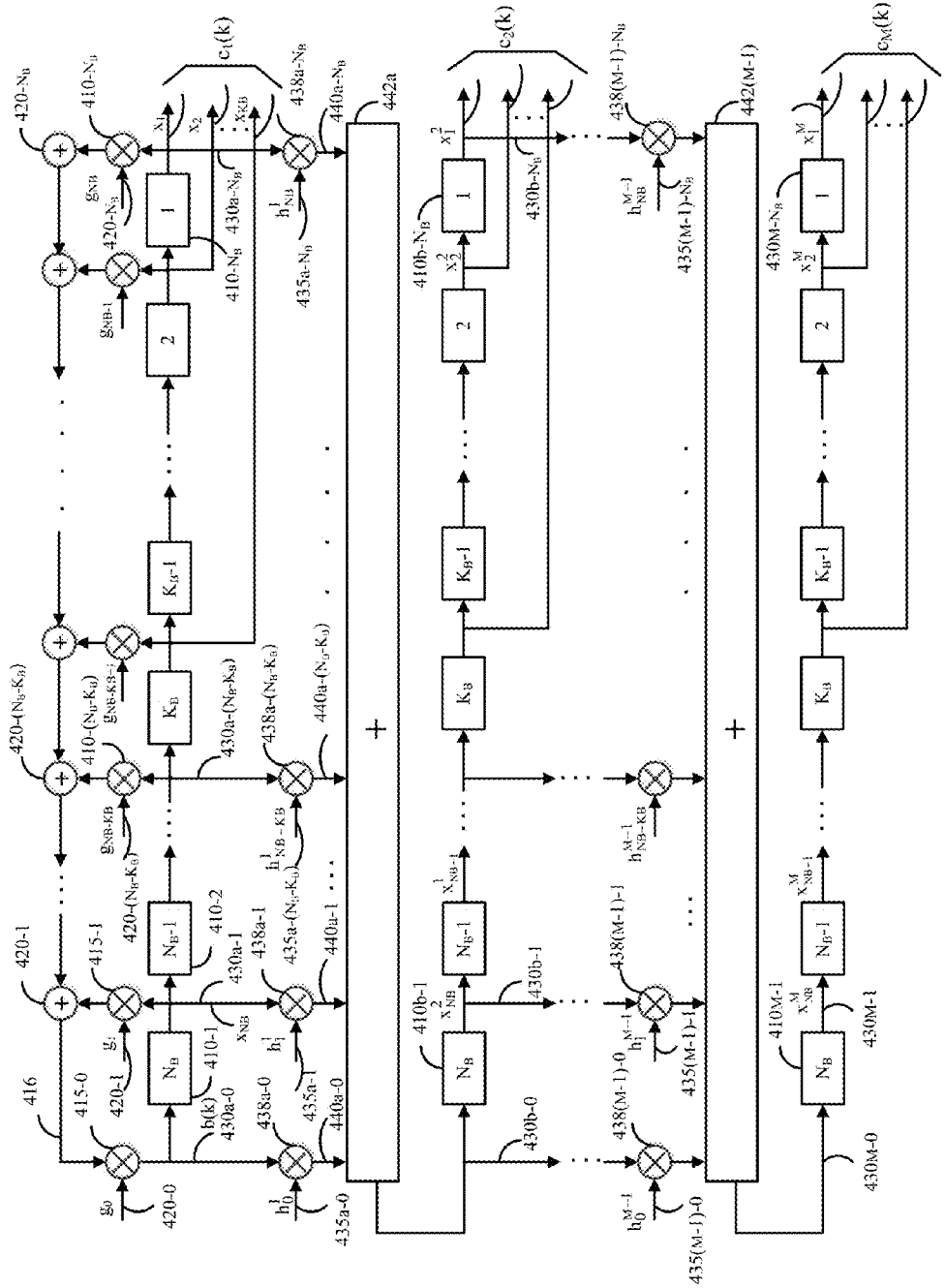
FIG. 4 shows a block diagram of one embodiment of code generation subsystem.

FIG. 4 is the block diagram of an embodiment of the code generation subsystem 400 wherein a multiplicity M of PN (pseudo random) codes are generated by appropriate delayed versions of a single PN code. Referring to FIG. 4, the feedback shift register is comprised of $N_B$ shift register stages 410-1 through 410-$N_B$. The outputs of the $N_B$ shift register stages 410-1 through 410-$N_B$ are multiplied by the respective $N_B$ binary valued feedback coefficients 420-1 through 420-$N_B$ $g_1, g_2, \ldots, g_{NB}$ by multipliers 415-1 through 415-$N_B$. Referring to FIG. 4, the outputs of the multipliers 415-1 through 415-$N_B$ are added by the modulo 2 adders 420-1 through 420-$N_B$ providing the binary sum 416 to the input of the multiplier 415-0. The operations of all the units in the code generation subsystem 400 is in modulo 2 arithmetic or in binary field. Referring to FIG. 4, the binary sum 416 is multiplied by the binary coefficient 420-0 $g_0$ for providing the output to the input 430a-0 of the shift register 410. The binary valued coefficients 420-0 through 420-$N_B$ $g_0, g_1, g_2, \ldots, g_{N_B}$ may be selected such that the polynomial $g(D) = g_0 + g_1 D + g_2 D^2 + \ldots + g_{N_B} D^{N_B}$ in the delay operator D is a primitive polynomial of degree $N_B$ for generation of a maximal length sequence with period $2^{N_B} - 1$ at the output $x_i$ 420-$N_B$.

In prior art frequency hopped spread spectrum systems, the outputs of all of the $N_B$ stages of the feedback shift register may be used to select the hop frequency, with a one to one mapping of the shift register states into the synthesizer frequencies, wherein the number of distinct frequencies, equal to the number of states of the feedback register, that need to be generated by the frequency synthesizer is equal to the period $2^{N_B} - 1$. The state of the shift register is the length $N_B$ vector comprised of the binary outputs of the $N_B$ shift register stages. The number of shift register states and the period of the sequence of frequencies generated by the frequency synthesizer based on the state of the shift register when g(D) is a primitive polynomial are both equal to $2^{N_B} - 1$.

In the FHFMSS transmitter of the invention, the complexity of the frequency synthesizer may be reduced by reducing the required number of distinct frequencies to be generated by the frequency synthesizer without reducing the period of the sequence. In order to reduce the number of distinct frequencies to be generated by the frequency synthesizer while keeping the period of the sequence of frequencies unchanged, only a subset $K_B$ of the $N_B$ stages of the feedback shift register are used to select the synthesizer frequency in FIG. 4. Referring to FIG. 4, the $K_B$, $K_B \leq N_B$, outputs $x_1, x_2, \ldots, x_{K_B}$ of the stages 410-($N_B-K_B+1$) through 410-$N_B$ of the shift register constitute the elements of the first code vector $c_1(k)$, k is the discrete time index, provided at the output of the code generation subsystem 400. That the sequence of frequencies generated by one to one map of the $2^{K_B}$ values of the sub state vector $[x_1, x_2, \ldots, x_{K_B}]$ into the synthesizer frequencies has a period $2^{N_B}-1$ may be seen as follows. If the period were less than $2^{N_B}-1$ then necessarily the component $x_1$ of the sub state vector will have a period less than $2^{N_B}-1$. However, $x_1$ is the PN code at the output of the feedback shift register and has period $2^{N_B}-1$, thus the period of the sequence of frequencies generated by one to one map of the $2^{K_B}$ values of the sub state vector must be $2^{N_B}-1$.

Referring to FIG. 4, a multiplicity M−1 code vector sequences may be generated as some selected delayed versions of the code vector sequence $c_1(n)$. Delaying of the component $x_j$ by L chip periods may be implemented by delaying the input 430a-0 to the shift register 410 by L−$N_B$ code chips if L>$N_B$ and ($2^{N_B}+L-N_B$) chips if L<$N_B$. Delaying of the input sequence 430a-0 denoted b(k) by any integer L may be implemented by multiplying the corresponding polynomial b(D) by the polynomial h(D) wherein $$b(D)=b_0+b_1 D+b_2 D^2+\ldots ; h(D)=\mathrm{mod}(D^L)g(D) \quad (23)$$

In (23) $\{b_0, b_1, \ldots\}$ denotes the sequence at the input 430a-0 and modulo g(D) operation refers to the remainder polynomial obtained after the Euclidean division of $D^L$ by g(D).

Referring to FIG. 4, the sequence b(k) is delayed sequentially by a multiplicity M−1 integers $L_1, L_2, \ldots L_{M-1}$ providing the delayed versions of b(k) with cumulative delays $L_1, (L_1+L_2), \ldots, (L_1+L_2+\ldots+L_{M-1})$ with the corresponding polynomials $h^1(D) \ldots, h^{M-1}(D)$. Referring to FIG. 4, the sequence 430a-0 b(k) and its delayed versions 430a-1 through 430a-$N_B$ are multiplied by the respective binary coefficients of the polynomial $h^1(D)$ 435a-0 through 435a-$N_B$ $h_0^1, h_1^1, \ldots, h_{N_B}^1$ by the multipliers 438a-0 through 438a-$N_B$ providing the result of multiplication 440a-0 through 440a-$N_B$ to the adder 442a. The output 430b-0 of the adder 442a is the $L_1$ chips delayed version of b(k). The binary coefficients 435a-0 through 435a-$N_B$ $h_0^1$, $h_1^1, \ldots, h_{N_B}^1$ are the coefficients of the polynomial $h^1(D)$ that is the remainder polynomial obtained after the Euclidean division of $D^{L_1}$ by g(D). Referring to FIG. 4, the first delayed sequence 430b-0 is inputted to the shift register 410b-1 through 410b-$N_B$. The outputs of the stages 1 through $K_B$ $x_1^2, x_2^2, \ldots, x_{K_B}^2$ of the shift register 410b constitute the elements of the second code vector $c_2(k)$. In the like manner, the first delayed sequence 430b-0 may be delayed by a delay of $L_2$ chips providing the third code vector $c_3(k)$ and so on providing the code vectors $c_1(k), \ldots, c_M(k)$ at the output of the code generation subsystem 400 for inputting to the multiplexer unit 220.

Figure 4A:
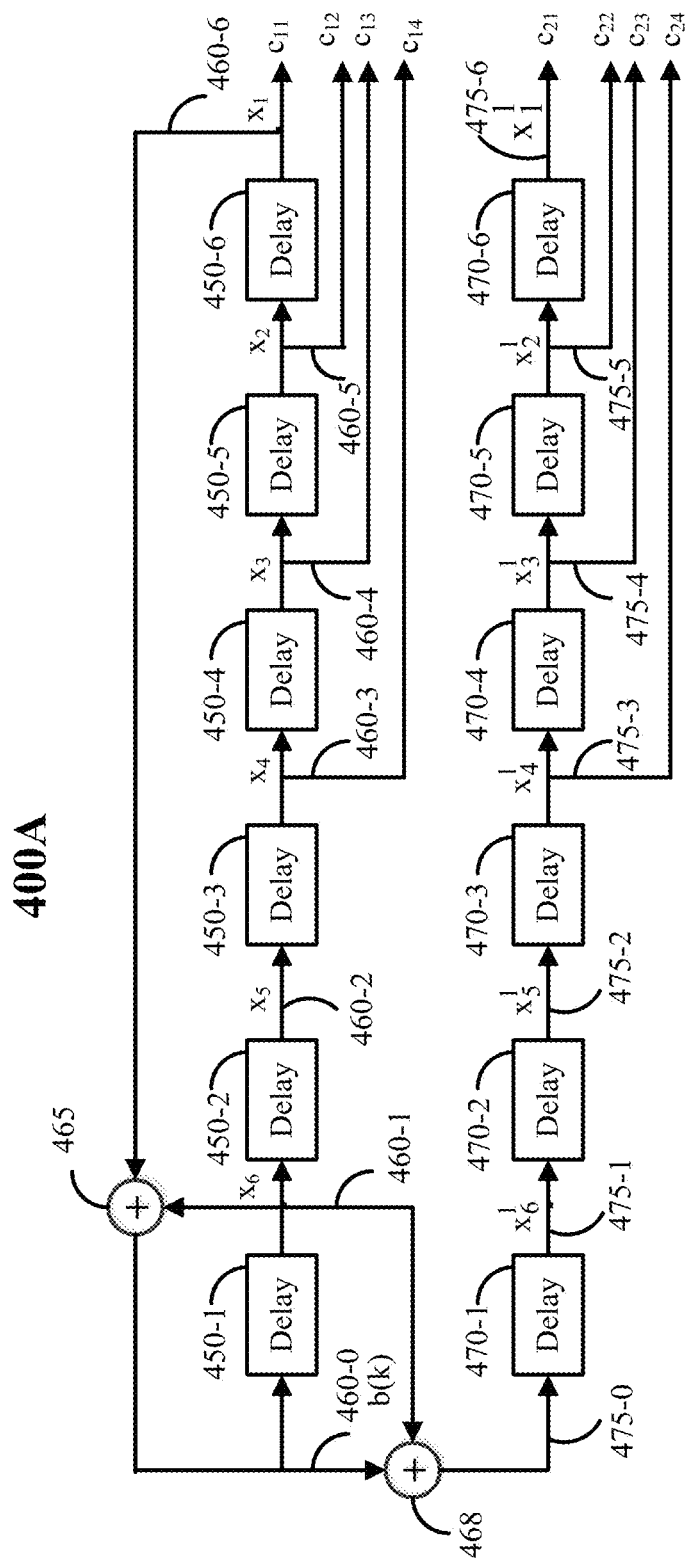
FIG. 4A shows a block diagram of one embodiment of code generation subsystem.

FIG. 4A shows the block diagram of an illustration of the code generation subsystem 400 for the case of M=2, $N_B$=6, $K_B$=4 and the delay $L_1$=6 with the primitive polynomial $g(D)=1+D^6$. The polynomial $h^1(D)$ is given by Euclidean division of $D^6$ by g(D) and is equal to (1+D). Referring to FIG. 4A, the first code generator is comprised of the shift register 450 with the shift register feedback comprised of the modulo 2 adder 465. Referring to FIG. 4A, the modulo 2 adder 465 is inputted with the outputs of the stages 450-1 $x_6$ and 450-6 $x_1$. The outputs of the last four stages 450-3 through 450-6 of the shift register comprise of the elements of the first code vector $c_1(k)$.

Referring to FIG. 4A, the sequence 460-0 b(k) at the input of the shift register 450 is delayed by $L_1$=6 chips by multiplying the polynomial b(D) corresponding to the sequence 460-0 b(k) by the polynomial $h^1(D)$=1+D. Referring to FIG. 4A, the polynomial division by $h^1(D)$ is implemented by adding the sequence b(k) 460-0 with the output 460-1 of the first stage of the shift register 450 via the adder 468. The output of the adder 468 is inputted to the shift register 470. Referring to FIG. 4A, the outputs of the last four stages 470-3 through 470-6 of the shift register 470 comprise of the elements of the second code vector $c_2(k)$.

Referring to FIG. 2, in various embodiments of the invention the code converter may map the code vector 222 c(l) into the normalized frequency κ(l) with a BCD (binary coded decimal) code. Referring to FIG. 4A, with the shift register 450 initial state selected to be 0 ... 0 1, the sequence of the normalized frequencies corresponding to the first code is given by [1 0 0 8 12 14 15 15 15 7 11 5 10 5 10 13 6 3 9 12 6 11 13 14 7 11 13 6 11 5 2 9 4 2 9 12 14 7 3 1 8 4 10 13 14 15 7 3 9 4 10 5 2 1 8 12 6 3 1 0 8 4 2]

The period of the normalized frequencies sequence is 63 that is equal to the period of the maximal length sequence of the PN code generated by a six stage feedback shift register. The distribution V of the normalized frequencies x is give by Table 2.

TABLE 2

Distribution of the normalized frequency κ

| κ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ν | 3 | 4 | 4 | 4 | 4 | 4 | 4 | 4 | 4 | 4 | 4  | 4  | 4  | 4  | 4  | 4  |

Figure 5:
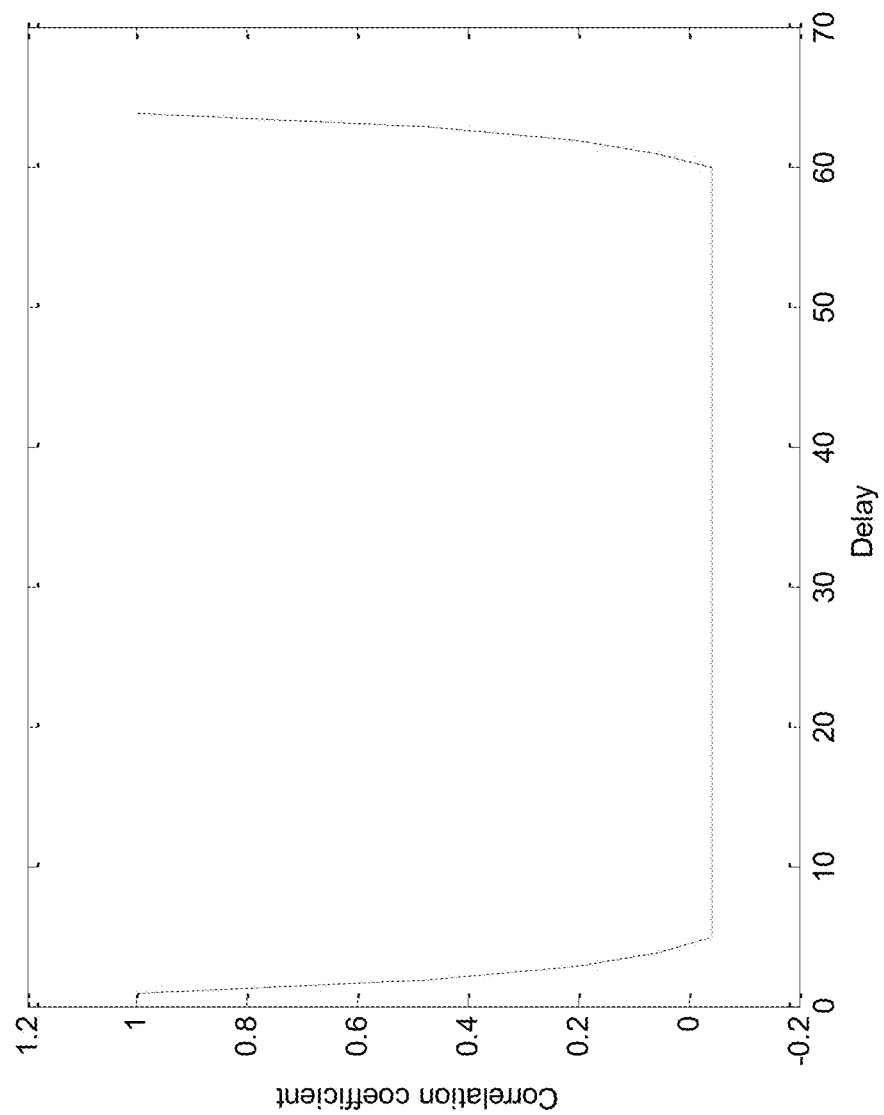
FIG. 5 shows a plot of correlation function of a pseudo random frequency sequence.

Table 2 shows that the distribution of the normalized frequencies κ is nearly uniform over the interval [0, 15] that is a property of random sequences. FIG. 5 plots the correlation coefficient versus the delay of the normalized frequency sequence corresponding to the code vector $c_1(k)$ of FIG. 4A. Referring to FIG. 5, the correlation coefficient is periodic in delay with a period of 64 and has a relatively small value of −0.0439 for the delay in the range of 4 to 60. The BCD frequency indices may also be mapped into a set of prime integers wherein the generated frequency sequences may inherit similar properties of the random sequences.

In various multiple access systems embodiments of the invention, the generation of different code vectors by feedback shift registers in the multiplicity $N_u$ multiple accessing FHFMSS transmitters may result in a collision among various FHFMSS signals in that with some nonzero probability, more than one FHFMSS signals may use the same M-tuple of periodic ψ-waveforms. Such a collision may result in an erasure of the information baseband symbol transmitted during the period of collision. In prior art FHSS systems, error correction codes with a capability of correcting for an expected number of such erasures are required for a successful transmission. In various embodiments of the invention, such collisions and erasures may be avoided by the generation of the $i^{th}$ code vector sequence for the multiple accessing user j $c_{ij}(n)$ by a cyclic permutation of the corresponding $i^{th}$ code vectors $c_{i1}(n)$, or that of the sub state vectors comprised of the $K_B$ stages of the feedback shift register generating the code vectors $c_{i1}(n)$, for the multiple accessing user 1. Different multiple accessing users are assigned the corresponding different cyclic permutation of the code vectors $c_{i1}n)$. The cyclic permutation may be implemented by the modulo $2^{K}B$ addition of an integer between 1 and $2^{K_B}-1$ to the BCD (Binary Coded Decimal) equivalent of the sub state vector. For example, with $K_B=6$, $2^{K_B}=64$, the BCD equivalent of the sub state vector of user 1 at any one time may take one of the values 0, 1, 2, ..., 63. Modulo 64 addition of integer 1 to the BCD equivalent of the sub state vector for the generation of the code for user 2, the sub state vector for user 2 has the corresponding values 1, 2, 3, ..., 64, 0 respectively and corresponds to a cyclic permutation of the sub state vectors of user 1. In a like manner, modulo 64 addition of integers 2 through 63 results in different cyclic permutations of the sub state vectors of user 1. Generation of the code vector sequences in this manner ensures that no two users will have the same sub state vector or the same code vector at any time thereby avoiding any possibility of collision among the FHFMSS signals of the various multiple accessing users.

Figure 5A:
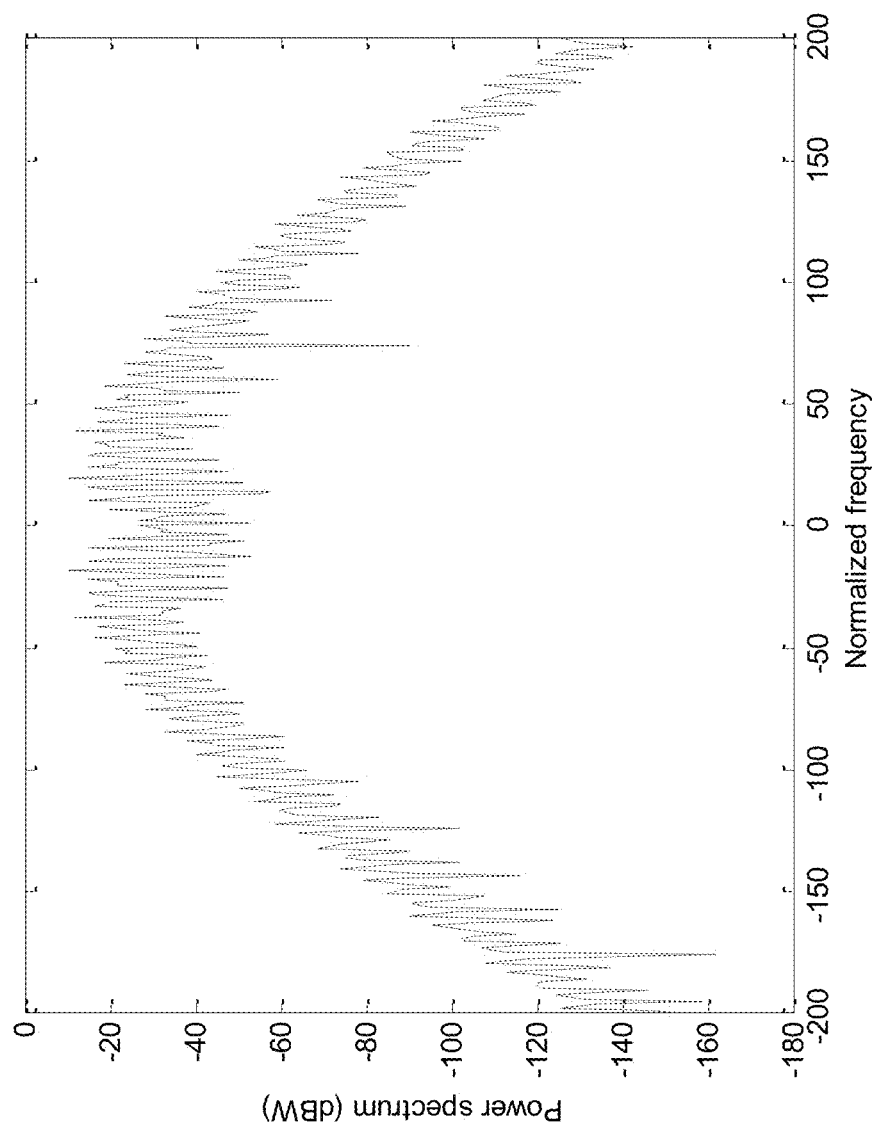
FIG. 5A shows a plot of the power spectral density in dBW of one embodiment of FHFM waveform.
Figure 5B:
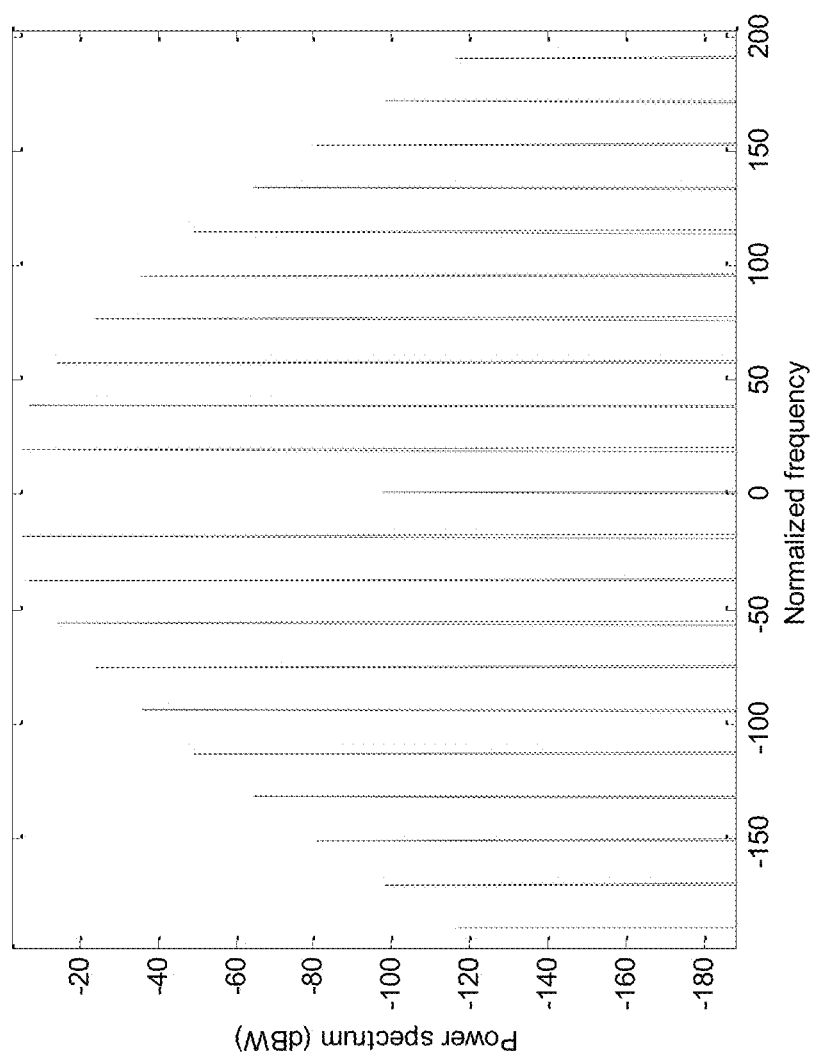
FIG. 5B shows a plot of the power spectral density in dBW of one embodiment of FHFM waveform.

In various multiple access systems embodiments of the invention, one or more of the multiplicity M code vector sequences may be common for the multiplicity $N_u$ multiple accessing users. In some of the embodiments, the common sequences may have a period equal to 1. The normalized frequency indices corresponding to the common sequences may be relatively prime to the normalized frequencies corresponding to the other sequences. For example with M=3, the first normalized frequencies may take values from the set of prime numbers {5, 7, 11, 13, ... } whereas the second and third sequences may have a period equal to 1 with the normalized frequencies equal to 8 and 9 respectively resulting in correlation coefficient $\rho_{uv}$ among any pair of multiple accessing user FHFM waveforms equal to the correlation coefficient obtained for the case of M=1 periodic ψ-waveform in the generation of the FHFM waveforms of the two users that is nearly equal to 0. However, unlike the M==1 case, the FHFM waveforms for the case of M=3 periodic ψ-waveforms possess dense power spectral density functions. For example, FIG. 5A shows the plot of the PSD of the FHFM waveform for the case of the normalized frequency triplet taken from the above example and equal to [19, 4, 9] with the corresponding mod indices equal to $\beta_1=2.4048$, $\beta_2=\beta_3=1$. As may be inferred from the FIG. 5A, the power spectral density of the FHFM waveform is a relatively dense function of frequency with a 99.9% power bandwidth equal to $77f_0$ comparable to the bandwidth equal to $77.7f_0$ estimated from Carson's rule. In comparison the sparse power spectral density function shown in FIG. 5B of the FHFM waveform for the case of a single normalized frequency of 19 only has nonzero spectral lines spaced at multiples of $19f_0$ with the 99.9% power bandwidth equal to $76f_0$.

Figure 6:
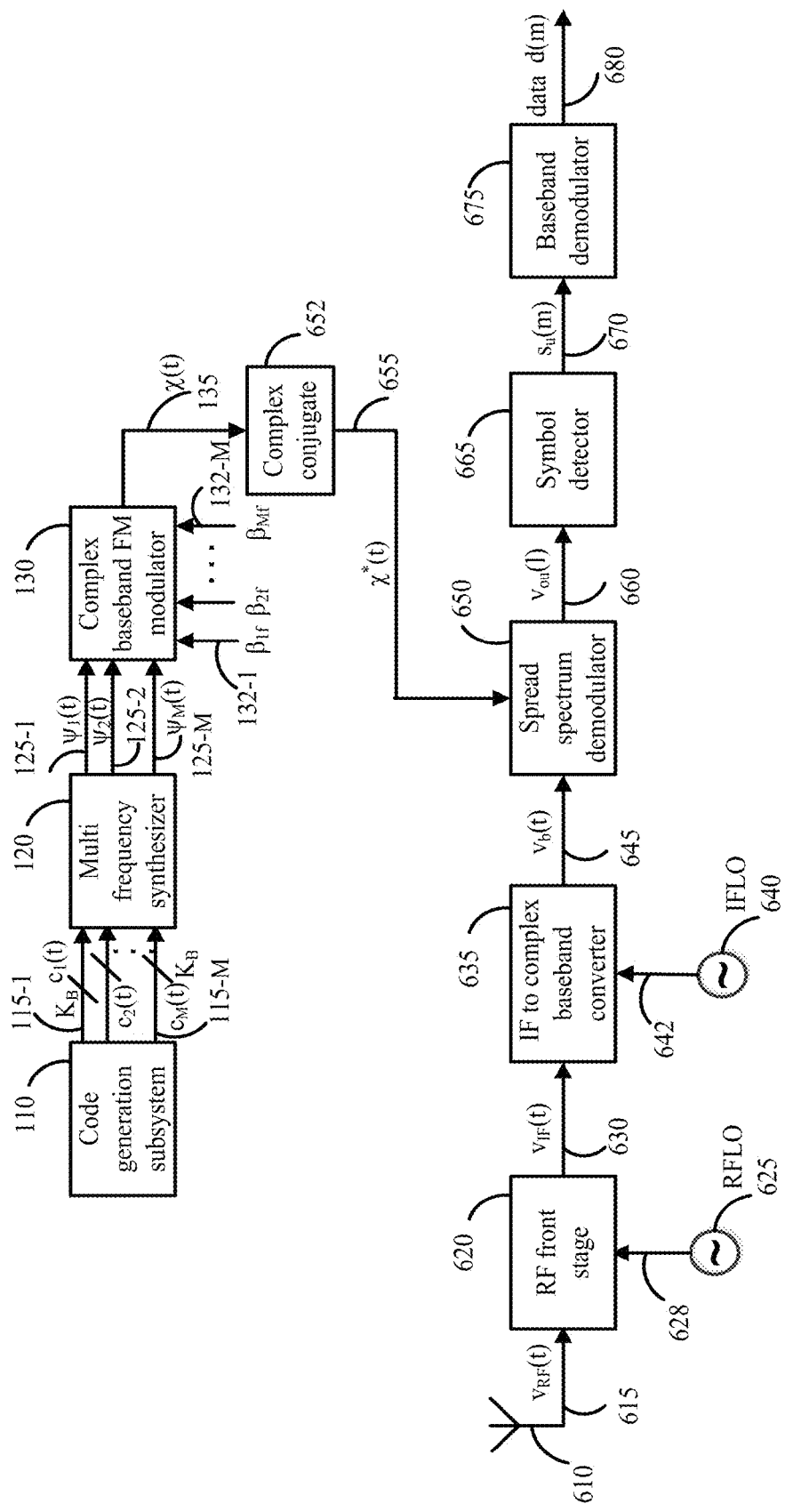
FIG. 6 shows a block diagram of one embodiment of FHFMSS receiver.

FIG. 6 shows an embodiment of the FHFMSS receiver 600 of the invention. Referring to FIG. 6, the transmitted FHFMSS signal at the center frequency $f_c$ is received by the receive antenna 610 providing the received RF (Radio frequency) signal 615 $v_{RF}(t)$ to the RF front stage unit 620. The RF front stage unit 620 is provided with the RF local oscillator signal 628 $\cos(2\pi f_{LO}^{RF}t)$ generated by the RF local oscillator 625 wherein the RF local oscillator frequency is given by $f_{LO}^{RF}=(f_c-f_{IF})$. The RF front stage unit 620 may be comprised of a band pass filter to reject out of band noise and interference, a down converter to down convert the center frequency of the input RF signal 307 to some appropriate intermediate frequency (IF) $f_{IF}$, and the RF and IF amplifiers.

Referring to FIG. 6, the RF front stage unit 620 provides the IF signal 630 $v_{IF}(t)$ to the IF to complex baseband converter 635. The IF to complex baseband converter 635 is provided with the IF local oscillator signal in phase and quadrature signals 642 $\cos(2\pi f_{IF}t)$ and $\sin(2\pi f_{IF}t)$ generated by the NCO (Numerically Controlled Oscillator) 640. The IF to complex baseband converter 635 may be comprised of demodulating the IF signal 630 $v_{IF}(t)$ by the in phase and quadrature signals 642 $\cos(2\pi f_{IF}t)$ and $\sin(2\pi f_{IF}t)$ and filtering the resulting signals by the low pass filters. The outputs of the low pass filters comprise of the real and imaginary components of the complex baseband signal 645 $v_b(t)$ at the output of the IF to complex baseband converter 635.

$$v_b(t) = \sum_{u=1}^{N_u} s_u(t)\chi_u(t) + n(t) = \sum_{u=1}^{N_u} s_u(t)\exp\left[j\beta \sum_{n=1}^{M} \sin(2\pi\kappa_{un} f_0 t)\right] + n(t) \quad (24)$$

In (24) $N_u$ is the number of multiple accessing users and n(t) is comprised of the receiver noise and any external interference, and $s_u(t)$ is the continuous time version of the information symbol sequence $s_u(k)$ of the multiple accessing user u. The signal $s_u(t)$ is equal to the information symbol $s_u(k)$ during the period $kT_s \le t < (k+1)T_s$, k=0, 1, ... with $T_s$ denoting the symbol period. Referring to FIG. 6, the complex baseband signal 645 $v_b(t)$ is inputted to the spread spectrum demodulator 650.

Referring to FIG. 6, the code generation subsystem 110 generates a multiplicity M code vector waveforms 115 $c_1(t)$, $c_2(t)$, ..., $c_M(t)$ wherein each of the code waveforms $c_n(t)$ is a vector valued function of time t possibly taking values 0 and 1 with $K_B$ denoting the dimension of the vector $c_n(t)$. In various embodiments of the invention, the various code waveforms may be generated by feedback shift registers of length $N_B$ with $K_B$ of the $N_B$ stages' outputs of the feedback shift register comprising the $K_B$ elements of the vector waveforms $c_n(t)$. In various other elements of the invention, the elements of the vector waveforms $c_n(t)$ may be periodic functions of time.

Referring to FIG. 6, the multiplicity M code vector waveforms 115 $c_1(t)$, $c_2(t)$, ..., $c_M(t)$ are inputted to the multi frequency synthesizer 120. The multi frequency synthesizer 120 generates a multiplicity M waveforms $\psi_1(t)$, $\psi_2(t)$, ..., $\psi_M(t)$ on the basis of the respective one of the code waveforms 115 $c_1(t)$, $c_2(t)$, ..., $c_M(t)$. In various embodiments of the invention the waveform $\psi_n(t)$ may be a sinusoidal waveform with its possibly time varying frequency selected form 1 out of $2^{K_B}$ possible values based on the $2^{K_B}$ possible values taken by the corresponding code waveform $c_n(t)$ for n equal to 1 through M. For example with $K_B=8$, the number of distinct frequencies of the waveforms $\psi_n(t)$ may be equal to 64. In various other embodiments of the invention waveforms $\psi_n(t)$ may be different from the sinusoidal waveforms. In multiple accessing system embodiments of the invention, various users may have different code waveforms 115 $c_1(t)$, $c_2(t)$, ..., $c_M(t)$ with corresponding different selection of the waveforms $\psi_1(t)$, $\psi_2(t)$, ..., $\psi_M(t)$.

Referring to FIG. 6, the multiplicity M waveforms 125 $\psi_1(t), \psi_2(t), \ldots, \psi_M(t)$ are inputted to the complex baseband FM (Frequency Modulation) modulator 130. Referring to FIG. 1, the complex baseband FM modulator 130 is provided with the modulation coefficients 132 $\beta_{1f}, \beta_{2f}, \ldots, \beta_{Mf}$. The product of the modulation coefficient $\beta_{nf}$ and the peak amplitude of the waveform $\psi_n(t)$ is equal to the peak frequency deviation in radians/sec due to the waveform $\psi_n(t)$ for n in the range of 1 through M.

The complex baseband FM modulator 130 frequency modules the multiplicity M waveforms 125 $\psi_1(t), \psi_2(t), \ldots, \psi_M(t)$ providing the complex valued FHFM (Frequency Hop Frequency Modulation) waveform 135 $\chi_u(t)$ for the multiple accessing user u given by (25).

$$\chi_u(t) = \exp\left[j\int_{-\infty}^{t} \{\beta_{1f}\psi_{u1}(\tau) + \ldots + \beta_{Mf}\psi_{uM}(\tau)\}d\tau\right]; j = \sqrt{-1} \quad (25)$$

In (25) $\psi_{u1}(t), \psi_{u2}(t), \ldots, \psi_{uM}(t)$ denote the specific selection of the multiplicity M waveforms $\psi_1(t), \psi_2(t), \ldots, \psi_M(t)$ for the multiple accessing user u. With the waveforms $\psi_{un}(t), n=1, 2, \ldots, M$ selected as the sinusoidal waveforms with frequencies $f_{un}$, the baseband FHFM waveform $\chi_u(t)$ in (25) may be written as $$\chi_u(t) = \exp\left[j\sum_{n=1}^{M}\beta_n\sin(2\pi f_{un}t)\right]; \beta_n = \beta_{nf}/(2\pi f_{un}), n = 1, 2, \ldots, M \quad (26)$$

In various embodiments of the invention $\beta_n$ for n between 1 and M may be equal to a constant $\beta$, the frequency $f_{un}$ may be an integer $\kappa_{un}$ multiple of a frequency $f_0$ for $1 \le n \le M$ and the output 135 $\chi_u(t)$ of the complex baseband FM modulator 130 provided to the complex conjugate operation unit 652 is given by $$\chi_u(t) = \exp\left[j\beta\sum_{n=1}^{M}\sin(2\pi\kappa_{un}f_0t)\right]; \kappa_{un} = f_{un}/f_0 \quad (27)$$

Referring to FIG. 6, the output 655 $\chi_u^*(t)$ of the complex conjugate operation unit 652 is inputted to the spread spectrum demodulator block 650. The spread spectrum demodulator block 650 correlates the complex baseband signal 645 $v_b(t)$ with the FHFM waveform $\chi_u(t)$ providing the despread signal 660 $v_{ou}(l)$ given by $$v_{ou}(l) = \frac{1}{T_0}\int_{(l-1)T_0}^{lT_0} v_b(t)\chi_u^*(t)dt = s_{pu}(l) + n_o(l); l = 0, 1, \ldots \quad (28)$$

In (28) $s_{pu}$ is the complex amplitude of the symbol waveform $s_u(t)$ during the interval $(l-1)T_0 \le t < lT_0$, $l=0, 1, \ldots$. The subsystem for the generation of the FHFM waveform 135 and the spread spectrum demodulator 650 constitute the despreading subsystem of the receiver.

Referring to FIG. 6, the spread spectrum demodulator output 660 $v_{ou}(l)$ is inputted to the symbol detector 665. The symbol detector is comprised of an integrator and a decision device, not shown. The integrator averages out the $N_m$ samples of $v_{ou}(l)$ during any symbol interval $T_s=N_mT_0$ and inputs the resulting estimate $\hat{s}_u(m)$ to the decision device.

For the case of $N_m=1$, the spread spectrum demodulator output 660 $v_{ou}(l)$ is inputted to the decision device of the symbol detector.

Referring to FIG. 6, the decision device in the symbol detector detects the information baseband symbols s(m) on the basis of the signal constellation diagram of the baseband modulator 145 at the FHFMSS transmitter of FIGS. 1-2 by mapping the estimate $\hat{s}_u(m)$ into one of the points of the signal constellation diagram of the baseband modulator 145 in the two dimensional signal space and provides the detected symbol 670 $s_u(m)$; m=0, 1, \ldots, to the baseband demodulation subsystem 675.

For example, the baseband modulator may be an M=64 QAM modulator with 64 points in the signal constellation diagram. The detection of the information baseband symbols may be based on, for example, the maximum likelihood criteria or the minimum distance criteria in the two dimensional signal space.

Referring to FIG. 6, the detected baseband symbol $s_u(m)$ is inputted to the baseband demodulator 675. The baseband demodulator 675 maps the detected baseband symbols $s_u(m)$ into groups of m binary digits, wherein $m=\log_2(M)$ assumed to be an integer, using the inverse of the map from group of m binary digits into 1 out of M possible information baseband symbols used in the baseband modulator 145 at the FHFMSS transmitter. The baseband demodulator block 675 may finally concatenate the groups of M binary digits into the serial stream 680 d(m) that constitutes the detected version of the user n input data 140 at the FHFMSS transmitter. In various embodiments of the invention, the baseband demodulator may also be comprised of an error correction decoder and a deinterleaver.

Various modifications and other embodiments of the invention applicable to various problems in Communication and other fields will be readily apparent to those skilled in the art in the field of invention. For example, the $\psi$-waveform may be selected to be different than the sinusoidal waveform in various embodiments of the invention.

The number of orthogonal FHFM waveforms in a given bandwidth $B_S$ may be increased by a factor of two by augmenting the set of FHFM waveforms $$\chi_{SK} = \exp\left[j\beta\sum_{n=1}^{M}\sin(2\pi\kappa_n f_0t)\right],$$

$\kappa_n$ prime integers, with the FHFM waveforms obtained by the FM modulation of the periodic $\psi$-waveforms different than the sin functions of time. For example, the augmented set of the FHFM waveforms may include the waveforms $$\chi_{CK} = \exp\left[j\beta\sum_{n=1}^{M}\cos(2\pi\kappa_n f_0t)\right]$$

wherein $\kappa_n$ are prime integers.

For the case of M=1, the set of FHFM waveforms $\{\chi_{SK}, \chi_{CK}; \kappa$ a prime integer$\}$ forms an orthogonal set in that the correlation coefficient of any pair of waveforms foromm the set is near zero except for a non zero coefficient $\rho_{sc}$ between the waveforms $\chi_{SK}, \chi_{CK}$ with the same value of $\kappa$. The non zero correlation coefficient $\rho_{sc}$ is a function of $\beta$ but does not depend upon $\kappa$. For example, for $\beta=2.4048$, $\rho_{sc}=-0.3645$. The extended set of the FHFM waveforms may be made orthogonal by replacing the FHFM waveforms $\chi_{s\kappa}$, $\chi_{c\kappa}$ by a pair of their weighted combinations given by (29).

$$\chi_{1,\kappa} = P_{11}\chi_{s,\kappa} + P_{12}\chi_{c,\kappa} \quad (29a)$$

$$\chi_{2,\kappa} = P_{21}\chi_{s,\kappa} + P_{22}\chi_{c,\kappa} \quad (29b)$$

In (29) $P_{ij}$; i, j=1, 2 are the elements of a 2×2 orthogonalization matrix P that is inverse of the square root factor of a matrix R given by (30).

$$R = \begin{bmatrix} 1 & \rho_{sc} \\ \rho_{sc}^* & 1 \end{bmatrix}; QQ^H = R; P = Q^{-1} \quad (30)$$

In (30) * denotes complex conjugate and the superscript H denotes complex conjugate transpose of a matrix. For the case of $\beta$=2.4048, the matrix P is given by $$P = \begin{bmatrix} -0.8870 & -0.8870 \\ -0.6053 & 0.6053 \end{bmatrix} \quad (31)$$

Referring to FIG. 2, in various embodiments of the invention, the TMDDFS unit 240 may generate discrete time version of both the $\psi$-waveforms $\sin(2\pi\kappa_n f_0 t)$ and $\sin(2\pi\kappa_n f_0 t)$ wherein the integers $\kappa_n$ are determined by the frequency selection indices 235 $c_{am}(n)$ for $1 \le m \le M$. Referring to FIG. 3, in various embodiments of the invention, the ROM word size for the ROM unit 340 may be selected to be $2K_S$ bits wherein the first $K_S$ bits store the samples of the function $\sin(2\pi f_0 t)$ with the last $K_S$ bits storing the samples of the $\cos(2\pi f_0 t)$ function. Referring to FIG. 3, the data buffer unit 345 may be comprised of a data splitter that may split the ROM word read from the memory into two outputs and may time multiplex the two outputs corresponding to the samples of the $\psi$-waveforms $\sin(2\pi\kappa_n f_0 t)$ and $\sin(2\pi\kappa_n f_0 t)$.

Referring to FIG. 2, in the FM modulator 250 unit, the mod. coefficients corresponding to the sin $\psi^I$-waveforms may be set to a constant $\beta$ with the mod. coefficients corresponding to the cos $\psi^I$-waveforms set to 0 wherein the exponentiation unit 265 may include a gain equal to $P_{11}$ providing the FHFM waveform $P_{11}\chi_s(k)$ at the output. A second baseband FM modulator unit, not shown, inputted with the $\psi^I$-waveforms 246 may set the mod. coefficients corresponding to the sin $\psi^I$-waveforms to 0 with the mod. coefficients corresponding to the cos $\psi^I$-waveforms set to $\beta$ wherein the gain in its exponentiation unit is set equal to $P_{12}$ with the second baseband FM modulator unit providing the FHFM waveform $P_{12}\chi_c(k)$ at the output. An adder, not shown, adds the two FHFM waveforms $P_{11}\chi_s(k)$ and $P_{12}\chi_c(k)$ providing the sum waveform $\chi_1(k)$ to the spread spectrum modulator 275.

In various multiple access systems embodiments of the invention, a second transmitter may replace the gains $P_{11}$ and $P_{12}$ of the exponentiation units of the two FM modulator units by $P_{21}$ and $P_{22}$ respectively for providing the waveform $\chi_2(k)$ to the spread spectrum modulator 275 resulting in the orthogonality of the FHFM waveforms generated by the two FHFMSS transmitters.

In various multiple access systems embodiments of the invention, wherein the FHFMSS transmitter is located, for example, at the base station of a cellular communication network, the transmitter may generate a multiplicity $N_u$ FHFM waveforms similar to the generation of the FHFM waveform 268 in the transmitter of FIG. 2 that modulate the respective ones of the multiplicity $N_u$ information baseband signals 150 for the generation of a multiplicity $N_u$ baseband FHFMSS signals, similar to 276 in FIG. 2, that may be added by an adder, not shown, to provide a composite baseband FHFMSS signal that is inputted to the cascade of the DAC 280, baseband to IF converter 165, and the RF stages unit 175 for the generation of the RF FHFMSS signal. In case when a number $N_p$ of the FHFM waveforms are generated by the periodic $\psi$-waveforms of the same normalized frequency $\kappa$, those $N_p$ waveforms are orthogonalized before modulating the corresponding information baseband signals. The orthogonalization may be performed by pre multiplying the vector comprised of the $N_p$ FHFM waveforms by the orthogonalization matrix P given by (31) for the case of $N_p$=2. The elements of the resulting product vector constitute the corresponding multiplicity $N_p$ orthogonalized FHFM waveforms.

The number of orthogonal FHFM waveforms in a given bandwidth $B_S$ may be further increased by a factor of two by augmenting the set of FHFM waveforms with the FHFM waveforms corresponding to a different values of the mod indices. For example, for the case of M=1, the augmented set of the FHFM waveforms may include the waveforms:

$$\chi_{s_1\kappa} = \exp\left[j\beta_1 \sum_{n=1}^{M} \sin(2\pi\kappa_n f_0 t)\right]; \chi_{s_2\kappa} = \exp\left[j\beta_2 \sum_{n=1}^{M} \sin(2\pi\kappa_n f_0 t)\right] \quad (32a)$$

$$\chi_{c_1\kappa} = \exp\left[j\beta_1 \sum_{n=1}^{M} \cos(2\pi\kappa_n f_0 t)\right]; \chi_{c_2\kappa} = \exp\left[j\beta_2 \sum_{n=1}^{M} \cos(2\pi\kappa_n f_0 t)\right] \quad (32b)$$

In (32) $\kappa$ is a prime integer, and $\beta_1$ and $\beta_2$ are two different mod indices and preferably are the zeros of the Bessel function $J_0(\ )$.

The extended set of multiplicity $N_p$=4 FHFM waveforms $\{\chi_{s_1\kappa}, \chi_{s_2\kappa}, \chi_{c_1\kappa}, \chi_{c_2\kappa}; \kappa$ a prime integer$\}$ forms an orthogonal set in that the correlation coefficient of any pair of waveforms from the set is near zero except for a non zero coefficients between the waveforms with the same value of $\kappa$. The non zero correlation coefficients are a function of $\beta_1$ and $\beta_2$ but do not depend upon $\kappa$. For example, for $\beta_1$=2.4048, and $\beta_2$=5.52 the correlation coefficient matrix R of the FHFM waveforms $\{\chi_{s_1\kappa}, \chi_{s_2\kappa}, \chi_{c_1\kappa}, \chi_{c_2\kappa}\}$ for any prime integer $\kappa$ is given by $$R = \begin{bmatrix} 1 & a & b & c \\ a & 1 & c & d \\ b & c & 1 & a \\ c & d & a & 1 \end{bmatrix}; a = -0.2966, b = -0.3645, c = 0.1564, d = .2141 \quad (33)$$

As for the case of $N_p$=2, the extended set of the FHFM waveforms may be made orthogonal by replacing the FHFM waveforms $\{\chi_{s_1\kappa}, \chi_{s_2\kappa}, \chi_{c_1\kappa}, \chi_{c_2\kappa}\}$ by their weighted combinations with weighting coefficients given by the rows of the matrix P given by (34).

$$P = \begin{bmatrix} -0.4634 & -0.8457 & 0.4634 & 0.8457 \\ 0.8873 & 0.2037 & 0.8873 & 0.2037 \\ -0.1417 & 0.6173 & -0.1417 & 0.6173 \\ 0.4883 & -0.2675 & -0.4883 & 0.2675 \end{bmatrix}; QQ^H = R; P = Q^{-1} \quad (34)$$

In some multiple accessing systems embodiments of the invention, the vector $\{\chi_{s_1\kappa}, \chi_{s_2\kappa}, \chi_{c_1\kappa}, \chi_{c_2\kappa}\}^T$ may be pre multiplied by the matrix P for the orthogonalization of the Np=4 FHFM waveforms as in the case of $N_p$=2. The number of orthogonal waveforms in the set of FHFM waveforms is thereby increased by a factor of $N_p$.

In the extended set of the FHFM waveforms, relatively low values of κ may be included for the higher value of β so that there is no significant increase in the bandwidth $B_s$ over that for the case of single mod index β. Increase in the number of orthogonal FHFM waveforms is thus achieved without an increase in the signal bandwidth $B_{SS}$ of the spread spectrum signal. The number of different mod indices may be increased to more than 2 at the cost of some additional complexity for a further increase in the set of orthogonal waveforms.

In various multiple accessing systems embodiments of the invention, wherein the FHFMSS transmitters generate orthogonalized FHFM waveforms, the FHFMSS receiver 600 in FIG. 6 may detect any of the multiplicity $N_u$ information baseband signals by despreading the baseband FHFMSS signal 645 by the spread spectrum demodulator 650 wherein the FHFM waveform 135 may be the corresponding one of the orthogonalized waveforms. The orthogonalized FHFM waveform at the receiver may be generated as at the transmitter and may be comprised of a multiplicity $N_p$ complex baseband FM modulators 130 generating the FHFM waveforms $\{\chi_{s_1\kappa}, \chi_{s_2\kappa}, \chi_{c_1\kappa}, \chi_{c_2\kappa}\}$ that are weighted combined with the weights given by the rows of the matrix P.

In various multiple accessing systems embodiments of the invention, wherein the FHFMSS receiver is located, for example, at the base station of a mobile communication network, the MS (mobile stations) transmitters may transmit the FHFMSS signals generated by spreading with the extended set of FHFM waveforms such as $\{\chi_{s_1\kappa}, \chi_{s_2\kappa}, \chi_{c_1\kappa}, \chi_{c_2\kappa}\}$ without the orthogonalization. The multiple accessing interference due to non zero correlation coefficient among some of the FHFM waveforms may be eliminated at the FHFMSS receiver. The FHFMSS receiver at the base station may generate a multiplicity $N_p$ FHFM waveforms $\{\chi_{s_1\kappa}, \chi_{s_2\kappa}, \chi_{c_1\kappa}, \chi_{c_2\kappa}\}$ similar to the generation of the FHFM waveform 135 χ(t) shown in the receiver of FIG. 6 and may comprise of a multiplicity $N_p$ spread spectrum demodulators similar to 650 of FIG. 6 that may be inputted with the respective ones of the multiplicity $N_p$ FHFM waveforms. The multiplicity $N_p$ spread spectrum demodulators are inputted with the baseband FHFMSS signal 645. A vector comprised of the outputs of the multiplicity $N_p$ spread spectrum demodulators may be pre multiplied by the matrix P in (34) to mitigate the multiple accessing interference due to the non zero correlation coefficients among the FHFM waveforms. The elements of the product vector comprise of the interference mitigated multiplicity $N_p$ despread signals similar to the signal 660 in FIG. 6. The multiple versions of various subsystems are not shown in FIG. 6 for a clear understanding of the invention.

The frequency hopped frequency modulation spread spectrum multiple accessing architectures of the invention can be readily modified and applied to various fields where such an architecture is applicable. Examples of such fields include Radars, sonar, digital audio systems and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent that the embodiments described herein may be implemented in many different embodiments of software, firmware, and/or hardware, for example, based on Field Programmable Gate Array (FPGA) chips or implemented in Application-Specific Integrated Circuits (ASICS). The software and firmware code may be executed by a computer or computing device comprising a processor (e.g., a DSP or any other similar processing circuit) including, for example, the computing device described below. The processor may be in communication with memory or another computer-readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated with a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 7:
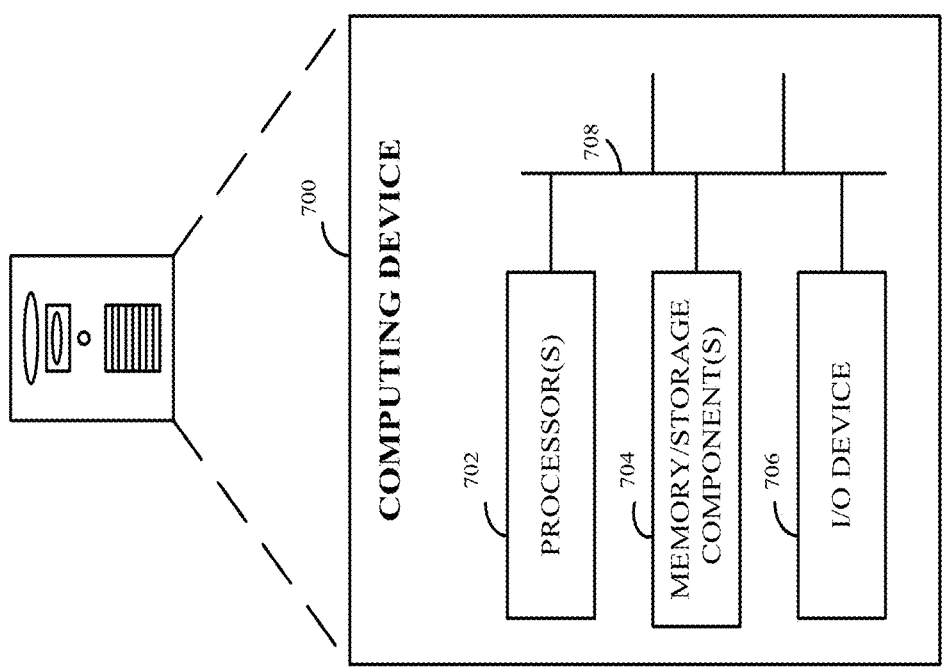
FIG. 7 shows one embodiment of an example computer device.

FIG. 7 shows an example of a computing device 700 according to one embodiment. For the sake of clarity, the computing device 700 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 7, the computing device 700 comprises one or more processor circuits or processing units 702, one or more memory and/or storage circuit component(s) 704 and one or more input/output (I/O) devices 706. Additionally, the computing device 700 comprises a bus 708 that allows the various circuit components and devices to communicate with one another. The bus 708 represents one or more of any of several types of bus structures, including a memory bus or memory controller, a peripheral bus, an accelerated graphics port, and a processor or local bus using any of a variety of bus architectures. The bus 708 may comprise wired and/or wireless buses.

The processing unit 702 may be responsible for executing various software programs such as system programs, application programs, and/or program modules/blocks to provide computing and processing operations for the computing device 700. The processing unit 702 may be responsible for performing various voice and data communications operations for the computing device 700 such as transmitting and receiving voice and data information over one or more wired or wireless communications channels. Although the processing unit 702 of the computing device 700 is shown in the context of a single processor architecture, it may be appreciated that the computing device 700 may use any suitable processor architecture and/or any suitable number of processors in accordance with the described embodiments. In one embodiment, the processing unit 702 may be implemented using a single integrated processor. The processing unit 702 may be implemented as a host central processing unit (CPU) using any suitable processor circuit or logic device (circuit), such as a general purpose processor. The processing unit 702 also may be implemented as a chip multiprocessor (CMP), dedicated processor, embedded processor, media processor, input/output (I/O) processor, co-processor, microprocessor, controller, microcontroller, application-specific integrated circuit (ASIC), field programmable gate array (FPGA), programmable logic device (PLD), or other processing device in accordance with the described embodiments.

As shown, the processing unit 702 may be coupled to the memory and/or storage component(s) 704 through the bus 708. The bus 708 may comprise any suitable interface and/or bus architecture for allowing the processing unit 702 to access the memory and/or storage component(s) 704. Although the memory and/or storage component(s) 704 may be shown as being separate from the processing unit 702 for purposes of illustration, it is worthy to note that in various embodiments some portion or the entire memory and/or storage component(s) 704 may be included on the same integrated circuit as the processing unit 702. Alternatively, some portion or the entire memory and/or storage component(s) 704 may be disposed on an integrated circuit or other medium (e.g., hard disk drive) external to the integrated circuit of the processing unit 702. In various embodiments, the computing device 700 may comprise an expansion slot to support a multimedia and/or memory card, for example.

The memory and/or storage component(s) 704 represent one or more computer-readable media. The memory and/or storage component(s) 704 may be implemented using any computer- readable media capable of storing data such as volatile or non-volatile memory, removable or non-removable memory, erasable or non-erasable memory, writeable or re-writeable memory, and so forth. The memory and/or storage component(s) 704 may comprise volatile media (e.g., random access memory (RAM)) and/or non-volatile media (e.g., read only memory (ROM), Flash memory, optical disks, magnetic disks and the like). The memory and/or storage component(s) 704 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 706 allow a user to enter commands and information to the computing device 700, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner, a touch sensitive screen, and the like. Examples of output devices include data ports, ADCs, DACs, a display device (e.g., a monitor or projector, speakers, a printer, a network card). The computing device 700 may comprise an alpha-numeric keypad coupled to the processing unit 702. The keypad may comprise, for example, a QWERTY key layout and an integrated number dial pad. The computing device 700 may comprise a display coupled to the processing unit 702. The display may comprise any suitable visual interface for displaying content to a user of the computing device 700. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 702 may be arranged to provide processing or computing resources to the computing device 700. For example, the processing unit 702 may be responsible for executing various software programs including system programs such as operating system (OS) and application programs. System programs generally may assist in the running of the computing device 700 and may be directly responsible for controlling, integrating, and managing the individual hardware components of the computer system. The OS may be implemented, for example, as a Microsoft® Windows OS, Symbian OS™, Embedix OS, Linux OS, Android system, Binary Run-time Environment for Wireless (BREW) OS, JavaOS, or other suitable OS in accordance with the described embodiments. The computing device 700 may comprise other system programs such as device drivers, programming tools, utility programs, software libraries, application programming interfaces (APIs), and so forth.

In various embodiments disclosed herein, a single component may be replaced by multiple components, and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

I claim:

1. An FHFMSS (Frequency Hopped Frequency Modulation Spread Spectrum) Multiple accessing transmitter system comprised of:
a baseband modulation subsystem for receiving and modulating a first input data signal providing, in general complex valued, a first information baseband symbols;
a FHFMSS modulation subsystem receiving a first information baseband symbols for providing a first baseband FHFMSS signal wherein the FHFMSS modulation subsystem is further comprised of:
a code generation subsystem for generating a multiplicity M sequences of code vectors wherein M is an integer greater than or equal to 1;
a frequency synthesizer for generating a multiplicity M periodic waveforms with frequencies that are distinct integer multiples of a fundamental frequency on the basis of the multiplicity M sequences of code vectors;
a first frequency modulation (FM) modulator modulating the multiplicity M periodic waveforms for generation of a first Frequency Hopped Frequency Modulation (FHFM) spreading waveform; and
a spread spectrum modulator modulating the first FHFM spreading waveform by the first information baseband symbols for generation of the first baseband FHFMSS signal.

2. System of claims 1 further comprised of:
a plurality of baseband modulation subsystems for receiving and modulating a second through $N_u$ of a plurality $N_u$ of input data signals;
a plurality of FHFMSS modulation subsystems for providing a second through $N_u$ of a plurality Nu of baseband FHFMSS signals; and a first adder for adding second through $N_u$ of the plurality $N_u$ of baseband FHFMSS signals to the first baseband FHFMSS signal.

3. System of claims 1 further comprised of:
a baseband to intermediate frequency (IF) converter modulating the first baseband FHFMSS signal by an IF local oscillator in phase and quadrature signals for providing an IF band pass FHFMSS signal;
an RF stages unit comprised of an up converter, a radio frequency (RF) band pass filter and power amplifier for providing an RF band pass FHFMSS signal.

4. System of claim 1 wherein the multiplicity M periodic waveforms are sinusoidal waveforms with frequencies that are relatively prime integer multiples of a fundamental frequency.

5. System of claim 1 wherein the multiplicity M of the code vector sequences is equal to 3.

6. System of claim 1 wherein the modulation indices of the FM modulator are the zeros of the $0^{th}$ order Bessel function of first kind.

7. System of claim 1 wherein the frequency synthesizer for the generation of a multiplicity M of periodic waveforms with frequencies that are distinct integer multiples of a fundamental frequency is a time multiplexed direct digital frequency synthesizer (TMDDFS) comprised of:
a multiplicity M of frequency registers for storing the multiplicity M distinct integers;
a multiplicity M of modulo $N_s$ phase accumulators wherein $N_s$ is a number of samples of a sinusoidal signal of fundamental frequency for providing the multiplicity M accumulated phase;
a time multiplexer for providing a time multiplexed accumulated phase;
a read only memory (ROM) for table look up of a sine function of the multiplexed accumulated phase; and
a buffer for outputting a time multiplexed multiplicity M sinusoidal waveforms.

8. System of claim 1 wherein the FHFMSS modulator is further comprised of a second FM modulator for the generation of a second FHFM waveform; and an adder for adding the second FHFM waveform to the first FHFM waveform.

9. System of claim 1 wherein the code generation subsystem for generating the multiplicity M sequences of code vectors is comprised of:
a maximal length pseudorandom code generator for the generation of a maximal length pseudorandom code further comprised of a first shift register of an integer $N_B$ number of stages;
generator of a first of the multiplicity M sequences of code vectors of dimension $K_B$ with the integer $K_B$ less than or equal to $N_B$ further comprised of collating the outputs of the $K_B$ number of stages of the first shift register;
generator of a first delayed version of the maximal length pseudorandom code comprised of a modulo 2 weighted sum of the outputs of the $N_B$ stages of the first shift register with binary weighting coefficients;
a second shift register of length $N_B$ inputted by the first delayed version of the maximal length pseudorandom code; and
generator of a second of the multiplicity M sequences of code vectors of dimension $K_B$ comprised of collating the outputs of the $K_B$ number of stages of the second shift register.

10. System of claim 2 wherein the code vector sequences in a second FHFMSS modulation subsystems are obtained by cyclic permutation of the corresponding code vector sequences in a first FHFMSS modulation subsystems.

11. System of claim 1 wherein the baseband modulator is configured to modulate the input data signal according to at least one technique selected from the group comprised of a Multiple Quadrature Amplitude Modulation (MQAM) technique, a Multiple Phase Shift Keying Modulation (MPSK) technique, and a Multiple Amplitude Shift Keying (MASK) technique.

12. An FHFMSS receiver comprised of:
a receive antenna for receiving (RF) band pass FHFMSS signal; an RF front stage unit receiving the output of the receive antenna and further comprised of an RF filter, amplifier and down converter for providing an Intermediate Frequency (IF) band pass FHFMSS signal;
an IF to complex baseband converter receiving the IF band pass FHFMSS signal for providing an estimated baseband FHFMSS signal;
a FHFMSS demodulation subsystem inputted with the estimated baseband FHFMSS signal for providing a first despread baseband signal wherein the FHFMSS demodulation subsystem is further comprised of:
a code generation subsystem for generating a multiplicity M sequences of code vectors;
a frequency synthesizer for generating a multiplicity M periodic waveforms with frequencies that are distinct integer multiples of a fundamental frequency on the basis of a the multiplicity M sequences of code vectors;
a frequency modulation (FM) modulator modulating the multiplicity M periodic waveforms for generation of a Frequency Hopped Frequency Modulation (FHFM) despreading waveform; and
a spread spectrum demodulator for despreading the baseband FHFMSS signal on the basis of the FHFM despreading waveform for the generation of a first despread baseband signal;
a symbol detector comprised of an integrator and a decision device inputted with a first despread baseband signal for providing a first detected information baseband symbols; and
a baseband demodulation subsystem receiving a first detected information baseband symbols for providing a first estimated input data.

13. Receiver of claim 12 further comprised of:
a plurality of FHFMSS demodulation subsystems for providing a second through Nu of a plurality Nu of despread baseband signals;
a subsystem for mitigation of multiple access interference from the plurality Nu of despread baseband signals; a plurality of symbol detectors inputted with the respective interference mitigated despread baseband signals for providing a second through Nu of a plurality of detected information baseband symbols; and
a plurality $N_u$ of baseband demodulation subsystems receiving the respective detected information baseband symbols for providing a plurality $N_u$ of estimated input data.

14. A method for the FHFMSS transmission and reception of input data signals, the transmission method comprising:
implementing, by a computer device, a baseband modulation subsystem for receiving and modulating the input data providing, in general complex valued, information baseband symbols;
implementing, by the computer device, a first code generation subsystem for generating a multiplicity $M_c$ sequences of code vector wherein $M_c$ is an integer that is greater than or equal to 1;
implementing, by the computer device, a first frequency synthesizer for generating a multiplicity M periodic sine waveforms with frequencies that are distinct integer multiples of a fundamental frequency on the basis of the multiplicity $M_c$ sequences of code vectors wherein $M \geq M_c$ and wherein the frequency synthesizer is for further generation of a first cosine wave with frequency that is a first integer multiple of the fundamental frequency;
implementing, by the computer device, a first frequency modulation (FM) modulator modulating the multiplicity M periodic sine waveforms with modulation index equal to a first zero of the zeroth order Bessel function for generation of a first Frequency Hopped Frequency Modulation (FHFM) spreading waveform;
implementing, by the computer device, a first first adder inputted with the first FHFM spreading waveform weighted by a coefficient for generation of a first orthogonal FHFM spreading waveform; and
implementing, by the computer device, a spread spectrum modulator modulating the first orthogonal FHFM spreading waveform by the information baseband symbols for providing a first baseband FHFMSS signal.

15. The FHFMSS transmission method of claim 14 wherein a coefficient is a first element of a first set of weighting coefficients the method further comprised of:
implementing, by the computer device, a plurality of baseband modulation subsystems for receiving and modulating a second through $N_p$ of a plurality $N_p$ of input data signals for providing a second through $N_p$ information baseband symbols wherein $N_p$ is equal to $2N_i$ with an integer $N_i$ that is greater than or equal to 1;
implementing, by the computer device, a second through Ni of a plurality $N_p$ of frequency modulators modulating the multiplicity M periodic sine waves wherein the modulation index of a first of the multiplicity M periodic sine waves is respectively equal to a second through $N_i$ zeros of the zeroth order Bessel function for generation of a second through Ni of a plurality $N_p$ of FHFM spreading waveforms;
implementing, by the computer device, a $(N_i+1)$th through $N_p$ of a plurality $N_p$ of frequency modulators modulating the first cosine wave and second through M of the multiplicity M periodic sine waves wherein the modulation index of a first cosine wave is respectively equal to a first through $N_i$ zeros of the zeroth order Bessel function for generation of a $(N_i+1)$th through $N_p$ of a plurality of FHFM spreading waveforms;
implementing, by the computer device, weighting of the second through $N_p$ FHFM spreading waveforms by the second through $N_p$ element of a first set of weighting coefficients respectively for providing the weighted FHFM spreading waveforms to the first adder;
implementing, by the computer device, a first second through first $N_p$ of a plurality $N_p$ of adders inputted with the multiplicity $N_p$ FHFM spreading waveforms weighted by the respective elements of a second through $N_p$ of a plurality $N_p$ of sets of weighting coefficients respectively for generation of a second through $N_p$ of a plurality $N_p$ of orthogonal FHFM spreading waveforms wherein the elements of the first through $N_p$ sets of weighting coefficients are given by the respective rows of an orthogonalizing matrix;
implementing, by the computer device, a second through $N_p$ of a plurality $N_p$ spread spectrum modulators modulating a second through $N_p$ information baseband symbols respectively by the respective ones of the plurality $N_p$ of orthogonal FHFM spreading waveforms for providing a second through $N_p$ baseband FHFMSS signals;
implementing, by the computer device, a second adder for adding second through $N_p$ of the plurality $N_p$ of baseband FHFMSS signals on to the first baseband FHFMSS signal;

implementing of an RF stages unit receiving the first baseband FHFMSS signal comprised of an up converter, an RF band pass filter and power amplifier for providing a radio frequency (RF) band pass FHFMSS signal; and transmission by a transmit antenna.

16. The method of claim 14, wherein the reception method is comprised of:

Receiving a radio frequency (RF) band pass FHFMSS signal by a receive antenna;

Filtering, amplifying and down conversion of the RF band pass FHFMSS signal for providing an IF band pass FHFMSS signal by an RF front stage unit;

implementing by, the computer device, an IF to complex baseband converter for providing an estimated baseband FHFMSS signal;

implementing by, the computer device, a code generation subsystem for generating a multiplicity M sequences of code vectors;

implementing by, the computer device, a frequency synthesizer for generating a multiplicity M periodic waveforms with frequencies that are distinct integer multiples of a fundamental frequency on the basis of a multiplicity M sequences of code vectors;

implementing by, the computer device, a frequency modulation (FM) modulator modulating the multiplicity M periodic waveforms for generation of a Frequency Hopped Frequency Modulation despreading (FHFM) waveform;

implementing by, the computer device, a spread spectrum demodulator for despreading the estimated baseband FHFMSS signal on the basis of the FHFM despreading waveform for generation of a first despread baseband signal; implementing by, the computer device, a symbol detector receiving a first despread baseband signal wherein the symbol detector is comprised of an integrator and a decision device for providing a first detected information baseband symbols; and implementing by, the computer device, a baseband demodulation subsystem receiving a first detected information baseband symbols for providing a first estimated input data.

17. Method of claim 14 wherein a coefficient is equal to 1 the method further comprised of:

implementing by, the computer device, a plurality of baseband modulation subsystems for receiving and modulating a second through $N_u$ of a plurality $N_u$ of input data signals for providing a second through $N_u$ information baseband symbols;

implementing by, the computer device, a plurality of code generation subsystems for providing a second through $N_u$ of a plurality Nu of multiplicity $M_c$ of sequences of code vectors;

implementing by, the computer device, selection of a second through $N_u$ of a plurality Nu of M tuples or sets of integers from a set S comprising a plurality $N_S$ of distinct M tuples of integers on the basis of the respective ones of the plurality Nu of multiplicity $M_c$ of sequences of code vectors wherein $N_s$ is an integer greater than or equal to $N_u$;

implementing by, the computer device, a second through $N_u$ of a plurality Nu of frequency synthesizers for generation of a second through $N_u$ of a plurality Nu of multiplicity M periodic waveforms with frequencies given by the respective M tuples of integers times the fundamental frequency;

implementing by, the computer device, a second through $N_u$ of a plurality Nu of frequency modulators modulating the respective ones of the plurality $N_u$ of the multiplicity M periodic waveforms for generation of the respective ones of a second through $N_u$ of a multiplicity $N_u$ of FHFM spreading waveforms;

implementing by, the computer device, a second through $N_u$ of a plurality Nu of spread spectrum modulators modulating the respective ones of the plurality Nu of the FHFM spreading waveforms by the corresponding ones of the plurality Nu of the information baseband symbols for providing a second through $N_u$ of a plurality Nu of baseband FHFMSS signals; and implementing, by the computer device, a second adder for adding second through $N_p$ of the plurality $N_p$ of baseband FHFMSS signals on to the first baseband FHFMSS signal.

18. Method of claim 17 wherein the set S comprised of a plurality $N_S$ of distinct M tuples of integers is constructed by, the computer device, by an iterative process for minimization of multiple access interference among the plurality Nu of baseband FHFMSS signals.

19. Method of claim 14 wherein the frequency synthesizer is a time multiplexed direct digital frequency synthesizer (TMDDFS) comprised of:

a multiplicity M of frequency registers for storing the multiplicity M distinct integers;

a multiplicity M of modulo $N_s$ phase accumulators wherein $N_s$ is the number of samples of the sinusoidal signal of fundamental frequency for providing the multiplicity M accumulated phase;

a time multiplexer for providing a time multiplexed accumulated phase;

a read only memory (ROM) for table look up of the sine function of the multiplexed accumulated phase; and a buffer for outputting the time multiplexed multiplicity M sinusoidal waveforms.

20. Method of claim 18 wherein the iterative process implemented by, the computer device, is comprised of:

Initial steps :

1. From a set $S_f$ comprised of an integer number $N_f$ of relatively prime integers, a set $S_0$ comprised of an integer N number of distinct M tuples of the elements of $S_f$ is generated wherein N is smaller than or equal to the number of all possible combinations of M elements selected from $S_f$;

2. Generate a set $S_w$ of multiplicity N FHFM waveforms obtained by FM modulation of the multiplicity M sinusoidal waveforms that have frequencies that are relatively prime integer multiples of a fundamental frequency where in the relatively prime integer multiples are given by the respective ones of the N elements of the set $S_0$.

3. Generate an N×N table P comprised of the cross correlation coefficients among the multiplicity N FHFM waveforms;

4. generate a set I comprised of integers 1 through N;

Iterative Steps:

Repeat steps (1) and (2) below for N-$N_S$ times

1. Generate a set R comprised of N elements with the $i^{th}$ element of R equal to the sum of the absolute value squares of the elements of the $i^{th}$ row of the matrix P for i equal to 1 through N;

2. With k denoting the index of the set R having the maximum value, replace the elements of the $k^{th}$ row and column of the matrix P with zeros, eliminate the index k from the set I;

The set S is comprised of the $N_S$ elements of the set $S_O$ with their indices given by the set I at the end of the iterative step.

* * * * *